(12) United States Patent
Dong et al.

(10) Patent No.: US 11,637,464 B2
(45) Date of Patent: Apr. 25, 2023

(54) ROTOR STRUCTURE, PERMANENT MAGNET AUXILIARY SYNCHRONOUS RELUCTANCE MOTOR AND ELECTRIC VEHICLE

(71) Applicant: GREE ELECTRIC APPLIANCES, INC. OF ZHUHAI, Zhuhai (CN)

(72) Inventors: Mingzhu Dong, Zhuhai (CN); Yusheng Hu, Zhuhai (CN); Yong Xiao, Zhuhai (CN); Bin Chen, Zhuhai (CN); Tong Tong, Zhuhai (CN); Suhua Lu, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 303 days.

(21) Appl. No.: 17/022,043

(22) Filed: Sep. 15, 2020

(65) Prior Publication Data

US 2021/0006110 A1 Jan. 7, 2021

Related U.S. Application Data

(63) Continuation of application No. PCT/CN2018/119872, filed on Dec. 7, 2018.

(30) Foreign Application Priority Data

Mar. 16, 2018 (CN) .......................... 201810219846.2

(51) Int. Cl.
*H02K 1/27* (2022.01)
*H02K 1/276* (2022.01)
*H02K 29/03* (2006.01)

(52) U.S. Cl.
CPC ............. *H02K 1/276* (2013.01); *H02K 29/03* (2013.01); *H02K 2213/03* (2013.01)

(58) Field of Classification Search
CPC .... H02K 1/276; H02K 29/03; H02K 2213/03; H02K 1/2773; H02K 1/2766; Y02T 10/64
See application file for complete search history.

(56) References Cited

U.S. PATENT DOCUMENTS

| 2013/0147302 A1 | 6/2013 | Rahman et al. |
| 2017/0187257 A1* | 6/2017 | Liu ........................ H02K 21/16 |
| 2019/0238014 A1* | 8/2019 | Koi ....................... H02K 1/2766 |

FOREIGN PATENT DOCUMENTS

| CN | 202142924 U | 2/2012 |
| CN | 202145611 U | 2/2012 |

(Continued)

OTHER PUBLICATIONS

First Office Action issued in counterpart Japanese Patent Application No. 2020-548630, dated Nov. 2, 2021.

(Continued)

*Primary Examiner* — Thomas Truong
(74) *Attorney, Agent, or Firm* — Westbridge IP LLC

(57) ABSTRACT

A rotor structure, a permanent magnet auxiliary synchronous reluctance motor and an electric vehicle are provided. The rotor structure includes a rotor body. A permanent magnet groove group is provided on the rotor body, the permanent magnet groove group includes an outer layer permanent magnet groove and an inner layer permanent magnet groove, and a magnetic conduction channel is formed between the outer permanent magnet groove and the inner layer permanent magnet groove which are adjacent. A deflection segment is formed on at least one end of the magnetic conduction channel, and a distance from the deflection segment to a quadrature-axis of the rotor body is decreased gradually outward in a radial direction, so that an end of the magnetic conduction channel is disposed near the quadrature-axis.

16 Claims, 17 Drawing Sheets

(56) References Cited

FOREIGN PATENT DOCUMENTS

| CN | 202444345 U | 9/2012 |
|---|---|---|
| CN | 102790458 A | 11/2012 |
| CN | 103475123 A | 12/2013 |
| CN | 104753214 A | 7/2015 |
| CN | 105958690 A | 9/2016 |
| CN | 106329773 A | 1/2017 |
| CN | 106936284 A | 7/2017 |
| CN | 108321951 A | 7/2018 |
| CN | 108321952 A | 7/2018 |
| CN | 108321953 A | 7/2018 |
| CN | 108321954 A | 7/2018 |
| CN | 108321955 A | 7/2018 |
| CN | 108322006 A | 7/2018 |
| CN | 108336842 A | 7/2018 |
| CN | 108336844 A | 7/2018 |
| CN | 108336845 A | 7/2018 |
| CN | 108566005 A | 9/2018 |
| CN | 108566006 A | 9/2018 |
| CN | 208015469 U | 10/2018 |
| DE | 102006021489 A1 | 11/2007 |
| DE | 102013209344 A1 | 12/2013 |

OTHER PUBLICATIONS

First Office Action in counterpart Chinese Patent Application No. 201810219846.2, dated Jul. 3, 2019.
International Search Report in corresponding PCT Application No. PCT/CN2018/119872, dated Mar. 6, 2019.
Written Opinion in corresponding PCT Application No. PCT/CN2018/119872, dated Mar. 6, 2019.
Extended European Search Report in counterpart European Patent Application No. 18909301.6, dated Mar. 22, 2021.

* cited by examiner

ROTOR STRUCTURE, PERMANENT MAGNET AUXILIARY SYNCHRONOUS RELUCTANCE MOTOR AND ELECTRIC VEHICLE

CROSS-REFERENCE TO RELATED APPLICATIONS

The present application is a continuation of International Application No. PCT/CN2018/119872 filed on Dec. 7, 2018, which claims priority to Chinese patent application No. 201810219846.2 filed on Mar. 16, 2018. Both applications are incorporated herein by reference in their entireties.

TECHNICAL FIELD

The present application relates to the field of motor equipment technologies, particularly to a rotor structure, a permanent magnet auxiliary synchronous reluctance motor and an electric vehicle.

BACKGROUND

Electric vehicles have characteristics of energy saving, environmental protection and so on, and have developed rapidly. In order to realize functions of high power density and high efficiency of existing electric vehicle drive motors, more and more motors adopt high-performance rare earth permanent magnet motors. Rare earth permanent magnet motors can achieve high efficiency and high power density, mainly by relying on high-performance rare earth permanent magnets, and the most widely used currently are neodymium iron boron rare earth permanent magnets. However, rare earth is a non-renewable resource, its price is relatively expensive, and a fluctuation of the price of rare earth is also large, resulting in higher production costs of electric vehicle drive motors, which is very unfavorable for promoting a comprehensive development of electric vehicles. Further, in the prior art, ferrite permanent magnet auxiliary synchronous reluctance motors have been applied to electric vehicles, but such motors have problems of high noise, easy demagnetization, low efficiency, and the like.

SUMMARY

A main purpose of the present application is to provide a rotor structure, a permanent magnet auxiliary synchronous reluctance motor and an electric vehicle to solve a problem of low efficiency of motors in the prior art.

In order to achieve the above purpose, according to an aspect of the present application, a rotor structure in which a permanent magnet groove group is disposed on a rotor body is provided, the permanent magnet groove group includes an outer layer permanent magnet groove and an inner layer permanent magnet groove, a magnetic conduction channel is formed between the outer layer permanent magnet groove and the inner layer permanent magnet groove which are adjacent, at least one end of the magnetic conduction channel is formed as a deflection segment, and a distance from the deflection segment to a quadrature-axis of the rotor body is gradually decreased outward in a radial direction, so that the at least one end of the magnetic conduction channel tends to approach the quadrature-axis.

Further, the magnetic conduction channel includes a first component segment, a second component segment and a third component segment connected in sequence. A first end of the first component segment is disposed toward a rotating shaft hole of the rotor body, and a second end of the first component segment is disposed to extend toward an outer edge of the rotor body. A first end of the third component segment is disposed toward the rotating shaft hole, and a second end of the third component segment is disposed to extend toward the outer edge of the rotor body. The first component segment and the third component segment are located on two sides of a direct axis, a distance from the first component segment to the direct axis is gradually increased outward in the radial direction of the rotor body, and the deflection segment is formed at one or both of the second end of the first component segment and/or the second end of the third component segment.

Further, a distance from the third component segment to the direct axis is gradually increased outward in the radial direction of the rotor body.

Further, the third component segment includes: a first straight segment, a first end of the first straight segment being connected to the second component segment; and a second straight segment, a first end of the second straight segment being connected to a second end of the first straight segment, a second end of the second straight segment extending along the outer edge of the rotor body and gradually approaching the quadrature-axis, an extension line of a geometric center line of the first straight segment and an extension line of a geometric center line of the second straight segment forming a first angle, and the second straight segment forming the deflection segment.

Further, a width of the first straight segment and a width of the second straight segment are equal.

Further, the first component segment includes: a third straight segment, a first end of the third straight segment being connected to the second component segment; and a fourth straight segment, a first end of the fourth straight segment being connected to a second end of the third straight segment, a second end of the fourth straight segment extending along the outer edge of the rotor body and gradually approaching the quadrature-axis, an extension line of a geometric center line of the third straight segment and an extension line of a geometric center line of the fourth straight segment forming a second angle, and the fourth straight segment forming the deflection segment.

Further, the outer layer permanent magnet groove includes: a first outer layer permanent magnet groove segment, a first end of the first outer layer permanent magnet groove segment being disposed to extend toward the rotating shaft hole, and a second end of the first outer layer permanent magnet groove segment being disposed toward the outer edge of the rotor body; and a second outer layer permanent magnet groove segment, a first end of the second outer layer permanent magnet groove segment being disposed to extend toward the rotating shaft hole and being disposed opposite to the first end of the first outer layer permanent magnet groove segment to form a V-shaped structure, a second end of the second outer layer permanent magnet groove segment being disposed toward the outer edge of the rotor body, and the first outer layer permanent magnet groove segment and the second outer layer permanent magnet groove segment being located on two sides of the direct axis.

Further, the outer layer permanent magnet groove includes: a first deflection groove, a first end of the first deflection groove being connected to the second end of the first outer layer permanent magnet groove segment, a second end of the first deflection groove being disposed to extend toward the outer edge of the rotor body, a geometric center line in a length direction of the first deflection groove and a geometric center line in a length direction of the first outer layer permanent magnet groove segment forming a third angle, and a distance between the geometric center line in the length direction of the first deflection groove and the quadrature-axis being gradually decreasing outward in the radial direction of the rotor body.

Further, a plane on which a side wall of the first deflection groove near the direct axis is located is coplanar or intersecting with a plane of a side wall on which the first outer layer permanent magnet groove segment near the direct axis is located.

Further, a width of the first deflection groove is decreased or increased gradually outward in the radial direction of the rotor body.

Further, a distance between a midpoint of a side wall, near the outer edge of the rotor body, of the second end of the first deflection groove near the outer edge of the rotor body and an intersection point of a geometric center line of the first outer layer permanent magnet groove segment and the outer edge of the rotor body is A, a width of an end of the second end of the first outer layer permanent magnet groove segment is M, and $0.6M \leq A$.

Further, a first magnetism isolation bridge is formed between the second end of the first deflection groove and the outer edge of the rotor body, $0.4 \times M \leq (H-H1)$ or $0.4 \times M \leq (H-H1) \leq 2 \times M$, M is a width of an end of the second end of the first outer layer permanent magnet groove segment, H is a distance between the second end of the first outer layer permanent magnet groove segment and the outer edge of the rotor body, and H1 is a width of the first magnetism isolation bridge.

Further, a width of the first end of the first deflection groove is less than a width of the second end of the first outer layer permanent magnet groove segment, and/or a width of the second end of the first deflection groove is less than the width of the second end of the first outer layer permanent magnet groove segment.

Further, $0.25 \times M \leq D1 \leq 0.8 \times M$, or $0.3 \times M \leq D1 \leq 0.45 \times M$, M is a width of an end of the second end of the first outer layer permanent magnet groove segment, and D1 is a width of the second end of the first deflection groove.

Further, the outer layer permanent magnet groove further includes: a second deflection groove, a first end of the second deflection groove being connected to the second end of the second outer layer permanent magnet groove segment, a second end of the second deflection groove being disposed to extend toward the outer edge of the rotor body, a geometric center line in a length direction of the second deflection groove and a geometric center line in a length direction of the second outer layer permanent magnet groove segment forming a fourth angle, and a distance between the geometric center line in the length direction of the second deflection groove and the quadrature-axis being gradually decreasing outward in the radial direction of the rotor body.

Further, the first deflection groove and the second deflection groove are disposed symmetrically with respect to the direct axis.

Further, the inner layer permanent magnet groove includes a first inner layer permanent magnet groove segment, a second inner layer permanent magnet groove segment and a third inner layer permanent magnet groove segment disposed in sequence. The first inner layer permanent magnet groove segment, the second inner layer permanent magnet groove segment and the third inner layer permanent magnet groove segment are connected in sequence to form a U-shaped structure with an opening toward the outer edge of the rotor body, or, the first inner layer permanent magnet groove segment, the second inner layer permanent magnet groove segment and the third inner layer permanent magnet groove segment are sequentially disposed at intervals, and a second magnetism isolation bridge is formed between adjacent two of the first inner layer permanent magnet groove segment, the second inner layer permanent magnet groove segment and the third inner layer permanent magnet groove segment.

Further, the first inner layer permanent magnet groove segment includes a third deflection groove, a first end of the third deflection groove is connected to an end of the first inner layer permanent magnet groove segment near the outer edge of the rotor body, a second end of the third deflection groove extends along the outer edge of the rotor body and approaches the quadrature-axis gradually; and the third inner layer permanent magnet groove segment includes a fourth deflection groove, a first end of the fourth deflection groove is connected to an end of the third inner layer permanent magnet groove segment near the outer edge of the rotor body, and a second end of the fourth deflection groove extends along the outer edge of the rotor body and approaches the quadrature-axis gradually.

Further, the third deflection groove and the fourth deflection groove are disposed symmetrically with respect to the direct axis.

Further, an angle A1 is formed between an extension line of a side wall, near the direct axis, of the first deflection groove and an extension line of a side wall, near the direct axis, of the second deflection groove, an angle A is formed between an extension line of a side wall, near the direct axis, of the first outer layer permanent magnet groove segment and an extension line of a side wall, near the direct axis, of the second outer layer permanent magnet groove segment, and $2 \times A \leq A1$.

Further, an angle B1 is formed between an extension line of a side wall, near the direct axis, of the third deflection groove and an extension line of a side wall, near the direct axis, of the fourth deflection groove, an angle B is formed between an extension line of a side wall, near the direct axis, of the first inner layer permanent magnet groove segment and an extension line of a side wall, near the direct axis, of the third inner layer permanent magnet groove segment, and $2 \times B \leq B1$.

Further, $1.1 \times B1 \leq A1$.

Further, the rotor structure further includes an outer layer permanent magnet and an inner layer permanent magnet, the outer layer permanent magnet is disposed in the outer layer permanent magnet groove, and the inner layer permanent magnet is disposed in the inner layer permanent magnet groove.

Further, a fifth angle $\alpha 1$ is formed between a connection line, connecting the rotating shaft hole and a surface of the outer layer permanent magnet near the direct axis of the rotor body and near an edge of the rotor body, and the direct axis of the rotor body, a sixth angle $\alpha 2$ is formed between a connection line, connecting the rotating shaft hole and a surface of the inner layer permanent magnet near the direct axis of the rotor body and near the edge of the rotor body, and the direct axis of the rotor body, $1.3 \times (\sin \alpha 1 / \sin \alpha 2) \leq S1/S2 \leq 2 \times (\sin \alpha 1 / \sin \alpha 2)$, S1 is a surface area of a surface, near the direct axis of the rotor body, of the outer layer permanent magnet, and S2 is a surface area of a surface, near the direct axis of the rotor body, of the inner layer permanent magnet.

Further, a thickness of at least part of the inner layer permanent magnet is greater than a thickness of the outer layer permanent magnet.

Further, a thickness of the outer layer permanent magnet is M1, and a thickness of the inner layer permanent magnet is M2, and $1.1 \times M1 \leq M2 \leq 1.8 \times M1$.

Further, the inner layer permanent magnet groove includes a first inner layer permanent magnet groove segment and a third inner layer permanent magnet groove segment. The first inner layer permanent magnet groove segment includes a third deflection groove, and the third inner layer permanent magnet groove segment includes a fourth deflection groove. A width of a second end of the third deflection groove and/or a width of a second end of the fourth deflection groove are D2, $D2 \leq 0.6 \times M2$, and M2 is a thickness of the inner layer permanent magnet.

Further, a midpoint of a connection line from a midpoint of a side wall, near an edge of the rotor body, of the second component segment to the edge of the rotor body is P, with a center of the rotor body as a circle center, a distance from the circle center to P as a radius, an arc is made along a circumferential direction of the rotor body, a sum of a thickness of the outer layer permanent magnet at intersections with the arc and a thickness of the inner layer permanent magnet at intersections with the arc is M3, and a circumference of the arc is C1, $M3/C1=T2$, and $45\% \leq T2 \leq 70\%$.

Further, a length of a surface, near the direct axis, of the outer layer permanent magnet and located in the first outer layer permanent magnet groove segment or the second outer layer permanent magnet groove segment is L, a maximum distance between the first outer layer permanent magnet groove segment 111 and the second outer layer permanent magnet groove segment 112 is C, and $0.8 \times C \leq L$.

Further, a width of the magnetic conduction channel is increased gradually outward in a radial direction of the rotor body, or a width of the magnetic conduction channel is decreased gradually outward in a radial direction of the rotor body, or a width of the magnetic conduction channel is increased gradually by a preset distance and then decreased gradually outward in a radial direction of the rotor body, or a width of the magnetic conduction channel is decreased gradually by a preset distance and then increased gradually outward in a radial direction of the rotor body.

Further, the permanent magnet groove group is plural, and a plurality of the permanent magnet groove groups are disposed evenly along the rotor body.

Further, at least one of the outer layer permanent magnet groove and the inner layer permanent magnet groove is plural.

Further, the outer layer permanent magnet groove is a U-shaped structure with an opening toward an outer edge of the rotor body.

According to another aspect of the present application, a permanent magnet auxiliary synchronous reluctance motor is provided, including a rotor structure, which is the rotor structure mentioned above.

According to another aspect of the present application, an electric vehicle is provided, including a rotor structure, which is the rotor structure mentioned above.

In an application of the technical solutions of the present application, a magnetic circuit of a rotor structure is optimized and a reluctance torque of a motor is improved by setting at least one end of a magnetic conduction channel with a deflection section and making a distance from the deflection section to a quadrature-axis of a rotor body decrease gradually outward in a radial direction, and a shape of a permanent magnet groove is further improved, such that an overall anti-demagnetization ability of a rotor permanent magnet is effectively improved, a torque ripple of the motor is reduced, a vibration and noise of the motor are reduced, a motor efficiency of the rotor structure with this structure is improved, and an anti-demagnetization ability of the motor is increased.

BRIEF DESCRIPTION OF DRAWINGS

The accompanying drawings forming a part of the present application are used to provide a further understanding of the present application. The exemplary embodiments of the present application and their descriptions are used to explain the present application and do not constitute an undue limitation on the present application. In the drawings.

The above drawings include the following reference signs:
- 10. rotor body; 11. outer layer permanent magnet groove; 12. inner layer permanent magnet groove; 13. magnetic conduction channel; 131. first component segment; 132. second component segment; 133. third component segment; 134. first straight segment; 135. second straight segment; 136. third straight segment; 137. fourth straight segment; 14. rotating shaft hole;
- 111. first outer layer permanent magnet groove segment; 112. second outer layer permanent magnet groove segment; 113. first deflection groove; 114. second deflection groove;
- 121. first inner layer permanent magnet groove segment; 122. second inner layer permanent magnet groove segment; 123. third inner layer permanent magnet groove segment; 124. third deflection groove; 125. fourth deflection groove;
- 20. outer layer permanent magnet;
- 30. inner layer permanent magnet;
- 40. stator.

DETAILED DESCRIPTION OF THE EMBODIMENTS

It should be noted that the embodiments in the present application and the features in the embodiments can be combined with each other if there is no conflict. The present application will be described in detail below with reference to the accompanying drawings and in conjunction with the embodiments.

As shown in a combination of FIGS. 1 to 8 and FIGS. 10 to 19, according to embodiments of the present application, a rotor structure is provided.

Specifically, the rotor structure includes a rotor body 10, and a permanent magnet groove group is provided on the rotor body 10. The permanent magnet groove group includes an outer layer permanent magnet groove 11 and an inner layer permanent magnet groove 12, and a magnetic conduction channel 13 is formed between the outer layer permanent magnet groove 11 and the inner layer permanent magnet groove 12 which are adjacent. A deflection segment is formed on at least one end of the magnetic conduction channel 13, and a distance from the deflection segment to a quadrature-axis of the rotor body 10 is decreased gradually outward in a radial direction, so that the at least one end of the magnetic conduction channel 13 tends to approach the quadrature-axis.

In this embodiment, a magnetic circuit of a rotor structure is optimized and a reluctance torque of a motor is improved by setting at least one end of a magnetic conduction channel with a deflection section and making a distance from the deflection section to a quadrature-axis of a rotor body decrease gradually outward in a radial direction, and a shape of a permanent magnet groove is further improved, such that an overall anti-demagnetization ability of a rotor permanent magnet is effectively improved, a torque ripple of the motor is reduced, a vibration and noise of the motor are reduced, a motor efficiency of the rotor structure with this structure is improved, and an anti-demagnetization ability of the motor is increased.

Figure 1:
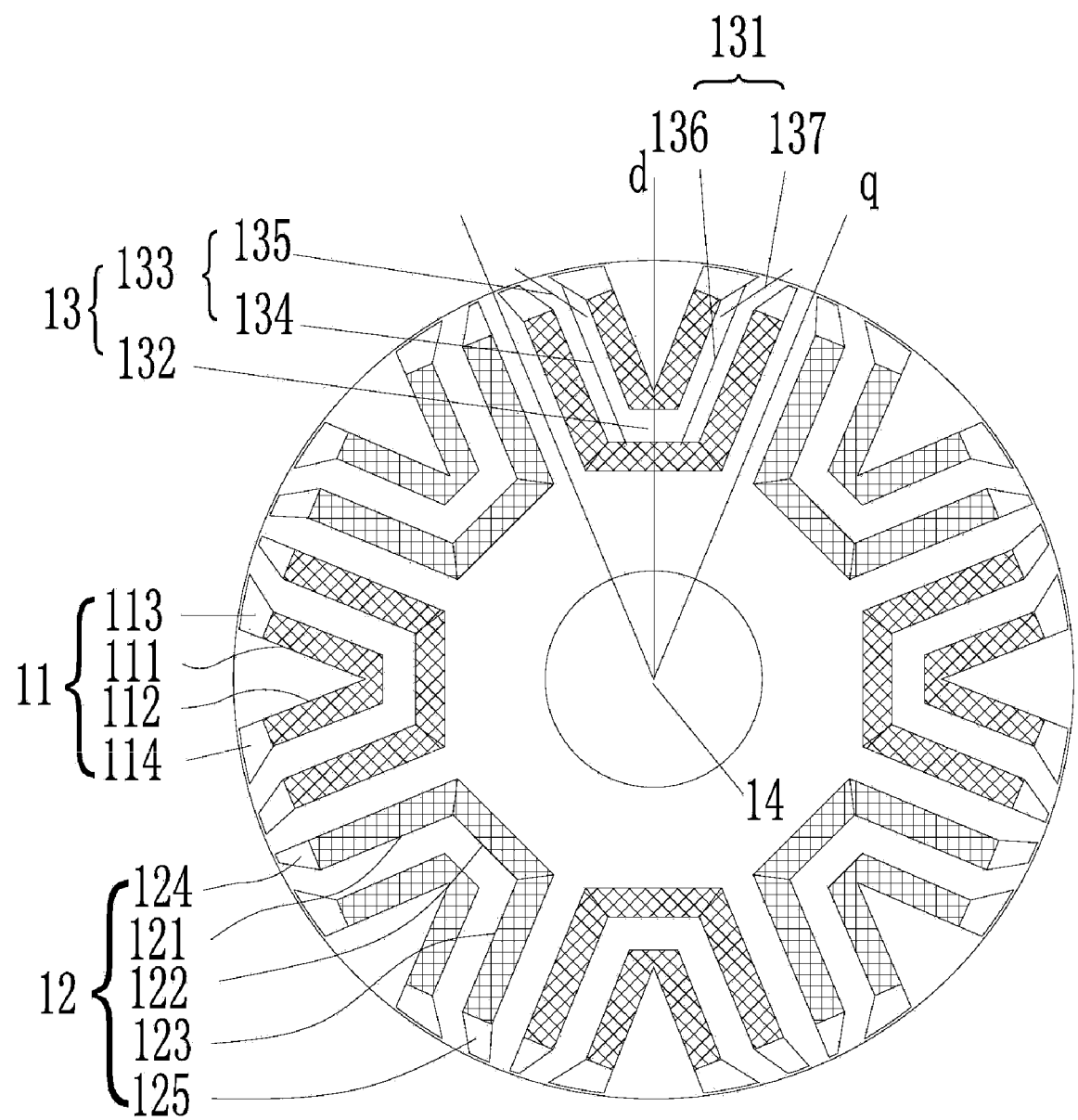
FIG. 1 is a schematic cross-sectional view illustrating a rotor structure according to a first embodiment of the present application.
Figure 2:
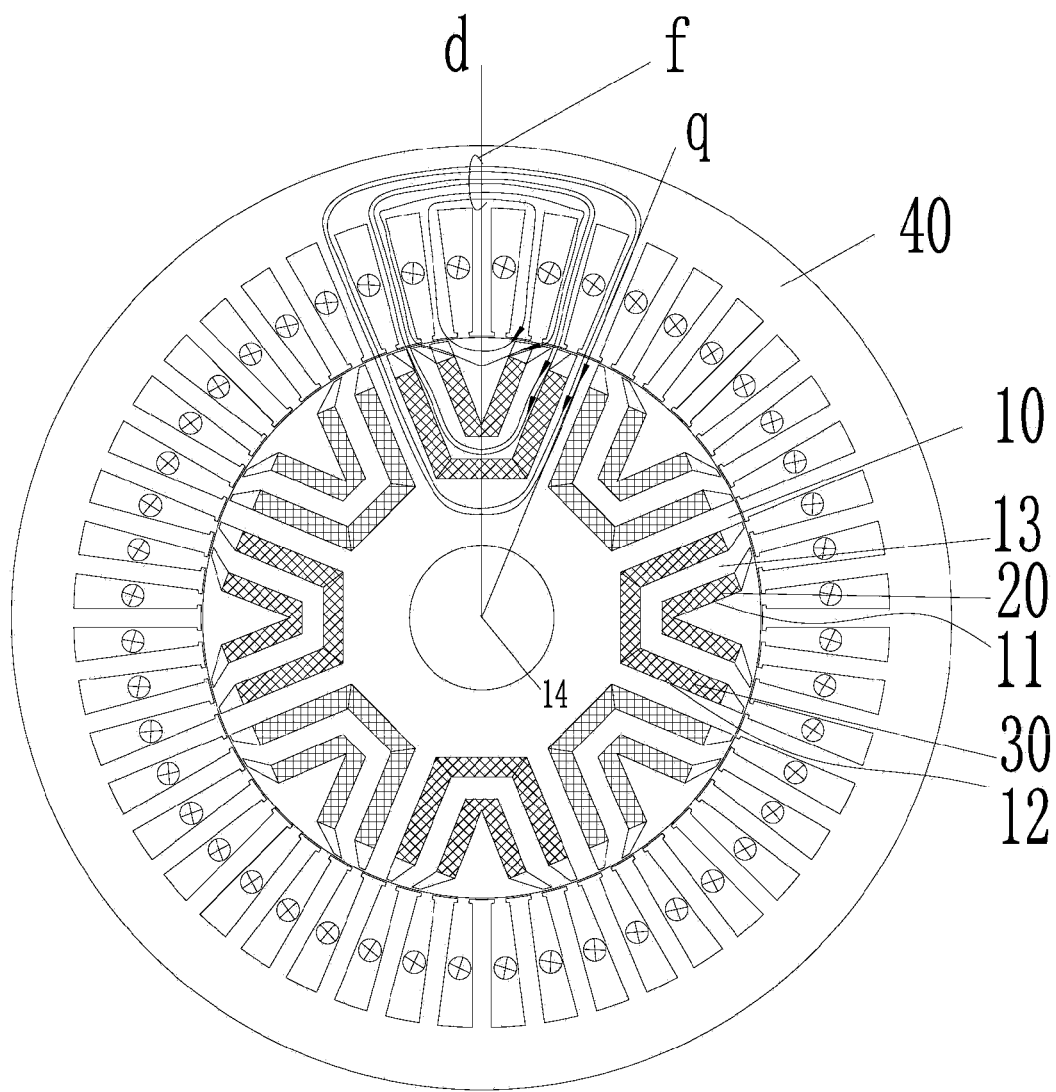
FIG. 2 is a schematic cross-sectional view illustrating a rotor structure according to a second embodiment of the present application.

As shown in FIG. 1, the magnetic conduction channel 13 includes a first component segment 131, a second component segment 132 and a third component segment 133 connected in sequence. A first end of the first component segment 131 is disposed toward a rotating shaft hole 14 of the rotor body 10, and a second end of the first component segment 131 is disposed to extend toward an outer edge of the rotor body 10. A first end of the third component segment 133 is disposed toward the rotating shaft hole 14 of the rotor body 10, and a second end of the third component segment 133 is disposed to extend toward the outer edge of the rotor body 10. The first component segment 131 and the third component segment 133 are located on two sides of a direct axis, and a distance from the first component segment 131 to the quadrature-axis is decreased gradually outward in a radial direction of the rotor body 10. The deflection segment is formed on the second end of the first component segment 131 or the second end of the third component segment 133, or of course, the deflection segment can be formed on the second end of the first component segment 131 and the second end of the third component segment 133. This setting effectively guides a direction of q-axis magnetic lines f, thus generating more magnetic flux under the same exciting current, improving a q-axis inductance of a motor, increasing a reluctance torque of the motor, and improving an efficiency and power density of the motor.

A distance from the third component segment 133 to the direct axis is increased gradually outward in the radial direction of the rotor body 10. This setting effectively guides a direction of q-axis magnetic lines f, so that the magnetic lines entering the magnetic conduction channel are increased.

In this embodiment, the third component segment 133 includes a first straight segment 134 and a second straight segment 135. A first end of the first straight segment 134 is connected to the second component segment 132. A first end of the second straight segment 135 is connected to a second end of the first straight segment 134, a second end of the second straight segment 135 extends along the outer edge of the rotor body 10 and approaches the quadrature-axis gradually, an extension line of a geometric center line of the first straight segment 134 and an extension line of a geometric center line of the second straight segment 135 form a first angle, and the second straight segment 135 forms the deflection segment. This setting facilitates an efficient introduction of the magnetic lines in the magnetic conduction channel.

A width of the first straight segment 134 and a width of the second straight segment 135 are equal. This setting can better guide the magnetic lines into magnetic conduction channels more evenly.

In this embodiment, the first component segment 131 includes a third straight segment 136 and a fourth straight segment 137. A first end of the third straight segment 136 is connected to the second component segment 132. A first end of the fourth straight segment 137 is connected to a second end of the third straight segment 136, and a second end of the fourth straight segment 137 extends along the outer edge of the rotor body 10 and approaches the quadrature-axis gradually. An extension line of a geometric center line of the third straight segment 136 and an extension line of a geometric center line of the fourth straight segment 137 form a second angle, and the fourth straight segment 137 forms the deflection segment. This setting facilitates an efficient introduction of the magnetic lines in the magnetic conduction channel.

In this embodiment, the outer layer permanent magnet groove 11 includes a first outer layer permanent magnet groove segment 111 and a second outer layer permanent magnet groove segment 112. A first end of the first outer layer permanent magnet groove segment 111 is disposed to extend toward the rotating shaft hole 14 of the rotor body 10, and a second end of the first outer layer permanent magnet groove segment 111 is disposed toward the outer edge of the rotor body 10. A first end of the second outer layer permanent magnet groove segment 112 is disposed to extend toward the rotating shaft hole 14 of the rotor body 10 and is disposed opposite to the first end of the first outer layer permanent magnet groove segment 111 to form a V-shaped structure, and a second end of the second outer layer permanent magnet groove segment 112 is disposed toward the outer edge of the rotor body 10. The first outer layer permanent magnet groove segment 111 and the second outer layer permanent magnet groove segment 112 are located on two sides of the direct axis. This setting is beneficial to guide q-axis magnetic lines of a stator 40 into the magnetic conduction channels more effectively and more evenly, increases a q-axis inductance of a motor, and improves a reluctance torque of the motor.

The outer layer permanent magnet groove 11 includes a first deflection groove 113. A first end of the first deflection groove 113 is connected to the second end of the first outer layer permanent magnet groove segment 111, and a second end of the first deflection groove 113 is disposed to extend toward the outer edge of the rotor body 10. A geometric center line in a length direction of the first deflection groove 113 and a geometric center line in a length direction of the first outer layer permanent magnet groove segment 111 form a third angle, and a distance between the geometric center line in the length direction of the first deflection groove 113 and the quadrature-axis is decreased gradually outward in the radial direction of the rotor body 10. This setting can better guide the magnetic lines of the stator into the magnetic conduction channels more evenly.

In this embodiment, a plane on which a side wall of the first deflection groove 113 near the direct axis is located and a plane on which a side wall of the first outer layer permanent magnet groove segment 111 near the direct axis is located are coplanar or intersected with each other. This setting can better guide the magnetic lines of the stator into the magnetic conduction channels more evenly.

A width of the first deflection groove 113 is decreased or increased gradually outward in the radial direction of the rotor body 10. This setting is convenient to guide the magnetic lines into the magnetic conduction channel to obtain a larger q-axis inductance.

In addition, a distance between a midpoint of a side wall, near the outer edge of the rotor body 10, of the second end of the first deflection groove 113 and an intersection point of a geometric center line of the first outer layer permanent magnet groove segment 111 and the outer edge of the rotor body 10 is A, a width of an end of the second end of the first outer layer permanent magnet groove segment 111 is M, and 0.6M≤A. This setting can make a guidance effect of the magnetic lines better, and obtain a larger q-axis inductance.

Further, a first magnetism isolation bridge is formed between the second end of the first deflection groove 113 and the outer edge of the rotor body 10, and 0.4×M≤(H−H1), or, 0.4×M≤(H−H1)≤2×M. M is a width of an end of the second end of the first outer layer permanent magnet groove segment 111, H is a distance between the second end of the first outer layer permanent magnet groove segment 111 and the outer edge of the rotor body 10, and H1 is a width of the first magnetism isolation bridge. This setting can make a guidance effect of the magnetic lines better, and thus obtain a larger q-axis inductance.

Further, a width of the first end of the first deflection groove 113 is less than a width of the second end of the first outer layer permanent magnet groove segment 111; and/or, a width of the second end of the first deflection groove 113 is less than the width of the second end of the first outer layer permanent magnet groove segment 111. In this way, by a design of gradually decreasing a width of the magnetic conduction channel, magnetic flux areas of the inner layer and outer layer permanent magnets can be adjusted better, and a consistency adjustment of working points of the inner layer and outer layer permanent magnets can be realized.

In this embodiment, 0.25×M≤D1≤0.8×M, or 0.3×M≤D1≤0.45×M, M is a width of an end of the second end of the first outer layer permanent magnet groove segment 111, and D1 is a width of the second end of the first deflection groove 113. This setting makes it easy for the magnetic lines to pass through the magnetism isolation bridge between a rotor permanent magnet groove and a rotor outer circumference, so as to obtain a large quadrature and direct axis inductance difference, and improve a reluctance torque of a motor.

In this embodiment, the outer layer permanent magnet groove 11 further includes a second deflection groove 114. A first end of the second deflection groove 114 is connected to the second end of the second outer layer permanent magnet groove segment 112, and a second end of the second deflection groove 114 is disposed to extend toward the outer edge of the rotor body 10. A geometric center line in a length direction of the second deflection groove 114 and a geometric center line in a length direction of the second outer layer permanent magnet groove segment 112 form a fourth angle, and a distance between the geometric center line in the length direction of the second deflection groove 114 and the quadrature-axis is decreased gradually outward in the radial direction of the rotor body 10. This setting can make a guidance effect of the magnetic lines better, and obtains a larger q-axis inductance.

The first deflection groove 113 and the second deflection groove 114 are disposed symmetrically with respect to the direct axis. This setting can better guide the magnetic lines of the stator into the magnetic conduction channels more evenly.

In this embodiment, the inner layer permanent magnet groove 12 includes a first inner layer permanent magnet groove segment 121, a second inner layer permanent magnet groove segment 122 and a third inner layer permanent magnet groove segment 123 disposed in sequence. The first inner layer permanent magnet groove segment 121, the second inner layer permanent magnet groove segment 122 and the third inner layer permanent magnet groove segment 123 are connected in sequence to form a U-shaped structure with an opening toward the outer edge of the rotor body 10. Alternatively, the first inner layer permanent magnet groove segment 121, the second inner layer permanent magnet groove segment 122 and the third inner layer permanent magnet groove segment 123 are sequentially disposed at intervals, and a second magnetism isolation bridge is formed between adjacent two of the first inner layer permanent magnet groove segment 121, the second inner layer permanent magnet groove segment 122 and the third inner layer permanent magnet groove segment 123. This setting enhances a mechanical strength of the rotor.

As shown in FIG. 1, the inner layer permanent magnet groove 12 further includes a third deflection groove 124. A first end of the third deflection groove 124 is connected to an end of the first inner layer permanent magnet groove segment 121 near the outer edge of the rotor body 10, and a second end of the third deflection groove 124 extends along the outer edge of the rotor body 10 and approaches the quadrature-axis gradually. The inner layer permanent magnet groove 12 further includes a fourth deflection groove 125. A first end of the fourth deflection groove 125 is connected to an end of the third inner layer permanent magnet groove segment 123 near the outer edge of the rotor body 10, and a second end of the fourth deflection groove 125 extends along the outer edge of the rotor body 10 and approaches the quadrature-axis gradually. By setting an angle of a deflection groove of a permanent magnet groove, q-axis magnetic lines of the stator 40 can be guided into the magnetic conduction channels more effectively and more evenly, a q-axis inductance of a motor can be increased, and a reluctance torque of the motor can be improved.

In this embodiment, the third deflection groove 124 and the fourth deflection groove 125 are disposed symmetrically with respect to the direct axis. This setting can better guide the magnetic lines of the stator into the magnetic conduction channels more evenly.

An angle A1 is formed between an extension line of a side wall, near the direct axis, of the first deflection groove 113 and an extension line of a side wall, near the direct axis, of the second deflection groove 114, an angle A is formed between an extension line of a side wall, near the direct axis, of the first outer layer permanent magnet groove segment 111 and an extension line of a side wall, near the direct axis, of the second outer layer permanent magnet groove segment 112, and $2 \times A \le A1$. This setting can more effectively guide q-axis magnetic lines of the stator into the magnetic conduction channels more evenly.

In this embodiment, an angle B1 is formed between an extension line of a side wall of the third deflection groove 124 near the direct axis and an extension line of a side wall of the fourth deflection groove 125 near the direct axis, an angle B is formed between an extension line of a side wall of the first inner layer permanent magnet groove segment 121 near the direct axis and an extension line of a side wall of the third inner layer permanent magnet groove segment 123 near the direct axis, and $2 \times B \le B1$. This setting can more effectively guide q-axis magnetic lines of the stator into the magnetic conduction channels more evenly.

Further, $1.1 \times B1 \le A1$, this setting can better guide the magnetic lines into the magnetic conduction channels more evenly.

In addition, the rotor structure further includes an outer layer permanent magnet 20 and an inner layer permanent magnet 30. The outer layer permanent magnet 20 is disposed in the outer layer permanent magnet groove 11, and the inner layer permanent magnet 30 is disposed in the inner layer permanent magnet groove 12. In this way, a magnetic circuit of the rotor structure is optimized, and a magnetic force of the rotor structure is raised, so that an overall anti-demagnetization ability of the rotor structure is effectively improved.

In this embodiment, a fifth angle $\alpha 1$ is formed between a connection line, connecting the rotating shaft hole 14 and a surface of the outer layer permanent magnet 20 near the direct axis of the rotor body 10 and near an edge of the rotor body 10, and the direct axis of the rotor body 10. A sixth angle $\alpha 2$ is formed between a connection line, connecting the rotating shaft hole 14 and a surface of the inner layer permanent magnet 30 near the direct axis of the rotor body 10 and near the edge of the rotor body 10, and the direct axis of the rotor body 10. $1.3 \times (\sin \alpha 1/\sin \alpha 2) \le S1/S2 \le 2 \times (\sin \alpha 1/\sin \alpha 2)$, S1 is a surface area of a surface, near the direct axis of the rotor body 10, of the outer layer permanent magnet 20 near the direct axis of the rotor body 10, and S2 is a surface area of a surface, near the direct axis of the rotor body 10, of the inner layer permanent magnet 30 near the direct axis of the rotor body 10. By setting an arrangement shape of the outer layer permanent magnet and a surface area of the inner layer and outer layer permanent magnets, the working points of the permanent magnets can be better adjusted, so that an average working point of the inner layer and outer layer permanent magnets is higher, and a ratio of the magnetic lines in the inner layer permanent magnet into the outer layer permanent magnet and directly into the stator 40 is more reasonable, which increases a permanent magnet flux linkage of the motor and improves the efficiency and power factor of the motor.

At least part of the inner layer permanent magnet 30 has a thickness greater than that of the outer layer permanent magnet 20. This setting makes rotor magnetic poles uniformly distributed on a circumference.

Further, a thickness of the outer layer permanent magnet 20 is M1, and a thickness of the inner layer permanent magnet 30 is M2, and $1.1 M1 \le M2 \le 1.8 \times M1$. This setting makes the inner layer and outer layer permanent magnets have the same anti-demagnetization ability.

In this embodiment, the inner layer permanent magnet groove 12 includes a first inner layer permanent magnet groove segment 121, a third inner layer permanent magnet groove segment 123, a third deflection groove 124 and a fourth deflection groove 125. A width of a second end of the third deflection groove 124 or a width of a second end of the fourth deflection groove 125 is D2, or, a width of the second end of the third deflection groove 124 and a width of the second end of the fourth deflection groove 125 are both D2. $D2 \le 0.6 \times M2$, and M2 is a thickness of the inner layer permanent magnet 30. This setting can effectively increase a stator flux into the rotor and enhances a q-axis inductance of the motor.

In this embodiment, a midpoint of a connection line from a midpoint of a side wall, near an edge of the rotor body 10, of the second component segment 132 to the edge of the rotor body 10 is P, with the rotating shaft hole 14 of the rotor body 10 as a center, a distance from the rotating shaft hole 14 to point P as a radius, an arc is made along a circumferential direction of the rotor body 10, a sum of a thickness of the outer layer permanent magnet 20 at intersections with the arc and a thickness of the inner layer permanent magnet 30 at intersections with the arc is M3, a circumference of the arc is C1, $M3/C1=T2$, and $45\% \le T2 \le 70\%$. By setting the thickness of the permanent magnets in this range, a ratio of the thickness of the permanent magnets to a thickness of the magnetic conduction channel is in a better range, which can not only guarantee the high working points of the permanent magnets to obtain a large anti-demagnetization ability and a high no-load flux linkage of the motor, but also make the motor obtain a large quadrature and direct axis inductance difference to improve the reluctance torque of the motor.

In this embodiment, a length of a surface, near the direct axis, of the outer layer permanent magnet 20 and located in the first outer layer permanent magnet groove segment 111 or the second outer layer permanent magnet groove segment 112 is L, a maximum distance between the first outer layer permanent magnet groove segment 111 and the second outer layer permanent magnet groove segment 112 is C, and $0.8 \times C \le L$. In this way, more permanent magnets can be placed in the same rotor to improve the efficiency and anti-demagnetization ability of the motor.

In this embodiment, a width of the magnetic conduction channel 13 is increased gradually outward in a radial direction of the rotor body 10, or a width of the magnetic conduction channel 13 is decreased gradually outward in a radial direction of the rotor body 10, or a width of the magnetic conduction channel 13 is increased gradually within a preset distance and then decreased gradually outward in a radial direction of the rotor body 10, or a width of the magnetic conduction channel 13 is decreased gradually within a preset distance and then increased gradually outward in a radial direction of the rotor body 10. This setting makes more magnetic lines of the stator 40 enter the magnetic conduction channel, so that the rotor can obtain a larger reluctance torque, thereby improving working efficiency of the rotor.

There are a plurality of permanent magnet groove groups, and the plurality of permanent magnet groove groups are disposed evenly along the rotor body 10. This setting makes rotor magnetic poles uniformly distributed on a circumference, which makes motor magnetic poles be symmetrically distributed, thus a torque ripple when the motor is loaded is reduced, and a vibration and noise of the motor is reduced.

In this embodiment, there are a plurality of outer layer permanent magnet grooves 11 and/or a plurality of inner layer permanent magnet grooves 12. In this way, a magnetic force of the rotor structure is raised, so that an overall anti-demagnetization ability of the rotor structure is effectively improved, thereby the working efficiency of the rotor is improved and the working efficiency of the motor with the rotor structure is effectively improved.

The outer layer permanent magnet groove 11 is a U-shaped structure with an opening toward an outer edge of the rotor body 10. This setting facilitates a formation of a stable magnetic conduction channel.

The rotor structure according to above embodiments can also be used in a field of motor equipment technologies, that is, according to another aspect of the present application, a permanent magnet auxiliary synchronous reluctance motor is provided, the permanent magnet auxiliary synchronous reluctance motor includes a rotor structure, and the rotor structure is the rotor structure above-described.

The rotor structure in the above embodiments can also be used in a field of vehicle equipment technologies, that is, according to another aspect of the present application, an electric vehicle is provided, the electric vehicle includes a rotor structure, and the rotor structure is the rotor structure above-described.

Figure 3:
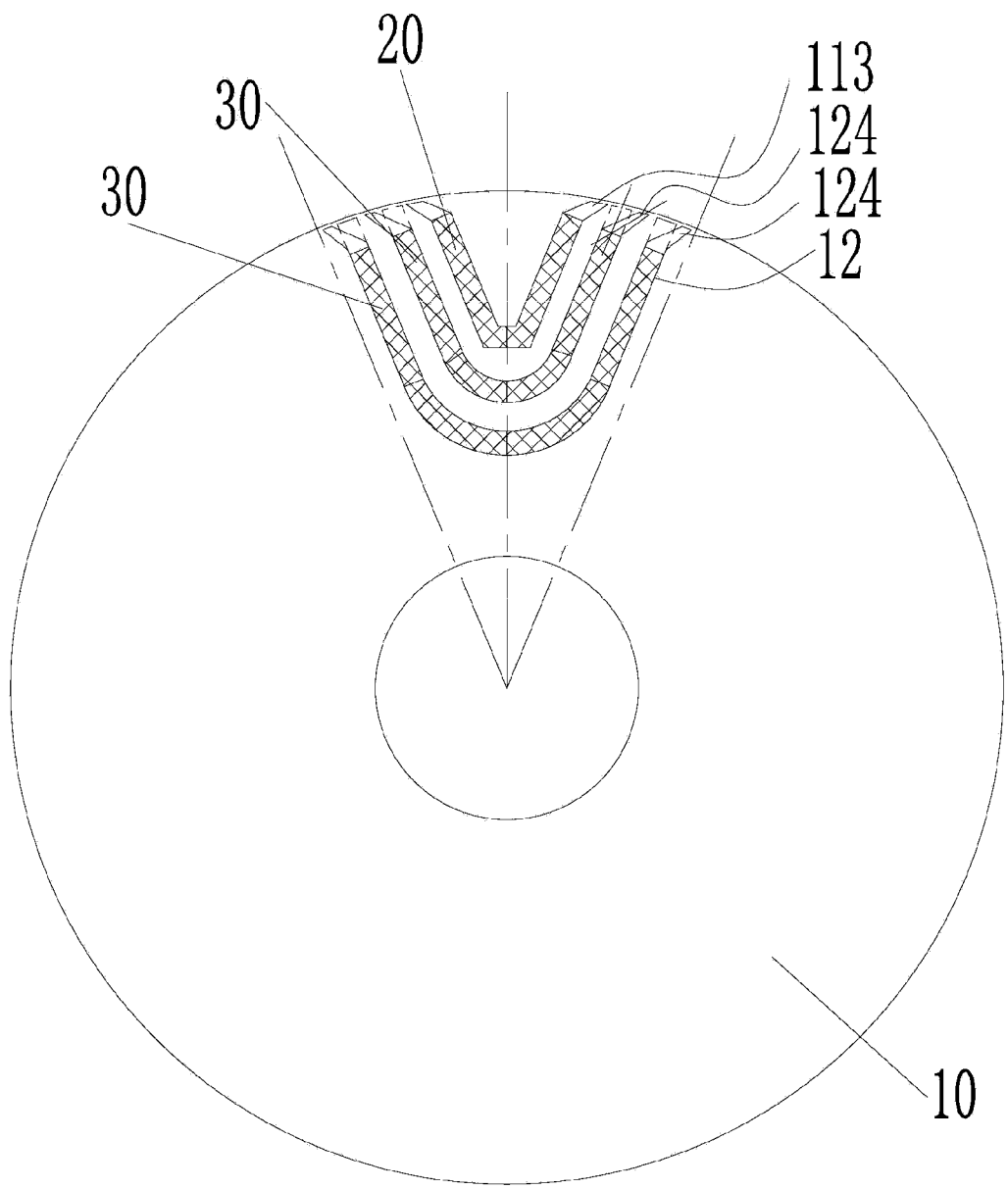
FIG. 3 is a schematic structural diagram illustrating a rotor structure according to a third embodiment of the present application.
Figure 4:
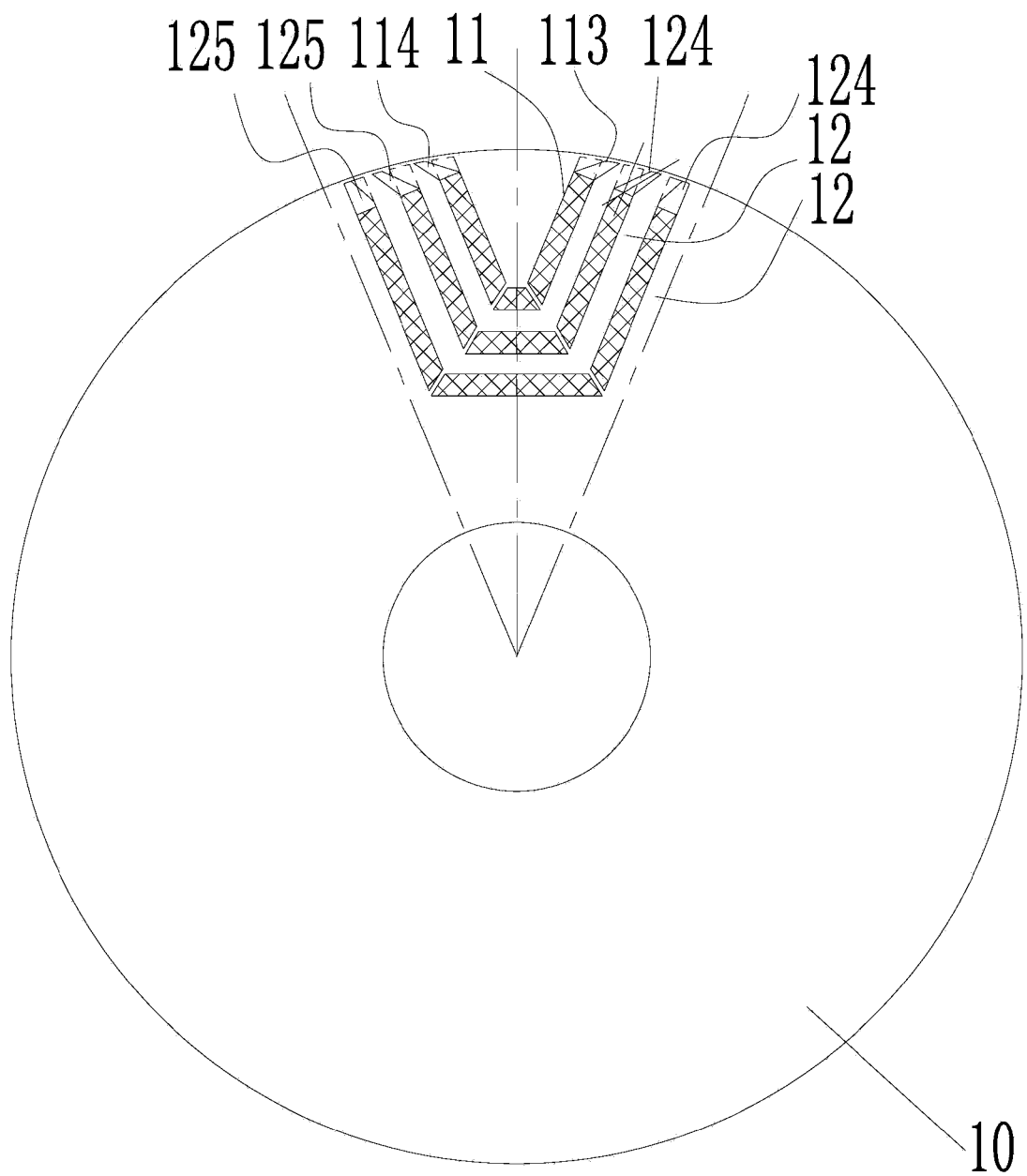
FIG. 4 is a schematic structural diagram illustrating a rotor structure according to a fourth embodiment of the present application.

In this embodiment, a motor includes a stator structure and a rotor structure. The stator structure includes a stator core and a winding group embedded in the stator core. The rotor structure includes permanent magnet grooves and permanent magnets located in the permanent magnet grooves. The rotor includes multiple layers of permanent magnets at a same magnetic pole. The multiple layers in this solution mean that the number of layers is greater than or equal to 2. The permanent magnets at the same magnetic pole have the same polarity toward the stator 40. A permanent magnet groove has a shape protruding toward an inner side of the rotor, two ends of the permanent magnet groove are close to an outer circumference of the rotor, and a center of the permanent magnet groove is close to the inner side of the rotor. A magnetic conduction channel is formed between any two adjacent permanent magnet grooves at the same magnetic pole, and an end of one or more magnetic conduction channels has a deflected segment deflected toward an inner layer permanent magnet, as shown in FIGS. 1 and 3.

Figure 19:
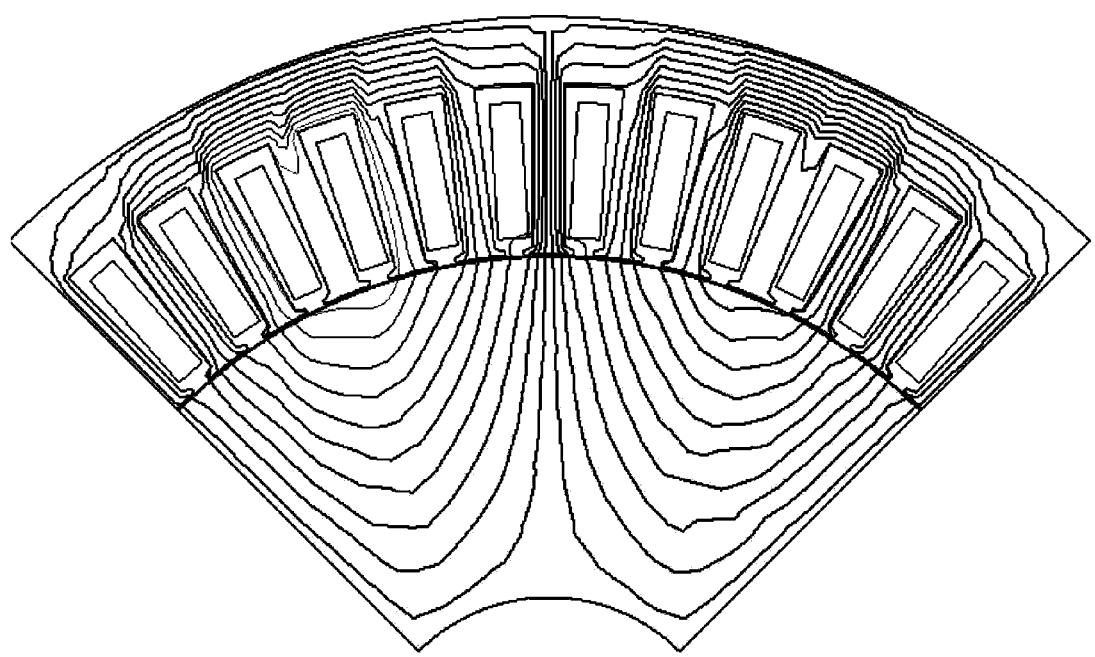
FIG. 19 is a schematic diagram illustrating a distribution of q-axis magnetic lines according to a rotor structure of the present application.

As shown in FIG. 19, the permanent magnet auxiliary synchronous reluctance motor produces the reluctance torque by a difference between the quadrature axis inductance and the direct axis inductance, and also by a permanent magnet torque generated by the permanent magnet. In this case, the reluctance torque of the motor may be improved by increasing a quadrature axis inductance of the motor and reducing a direct axis inductance of the motor, and the permanent magnet torque of the motor may be improved by increasing no-load flux linkage of the motor. It is found that the magnetic lines on each tooth of stator 40 are not uniform when the stator 40 of the motor is fed with a three-phase symmetrical alternating current. The closer a position is to a boundary line, the more magnetic lines are on the teeth of the stator 40.

Figure 7:
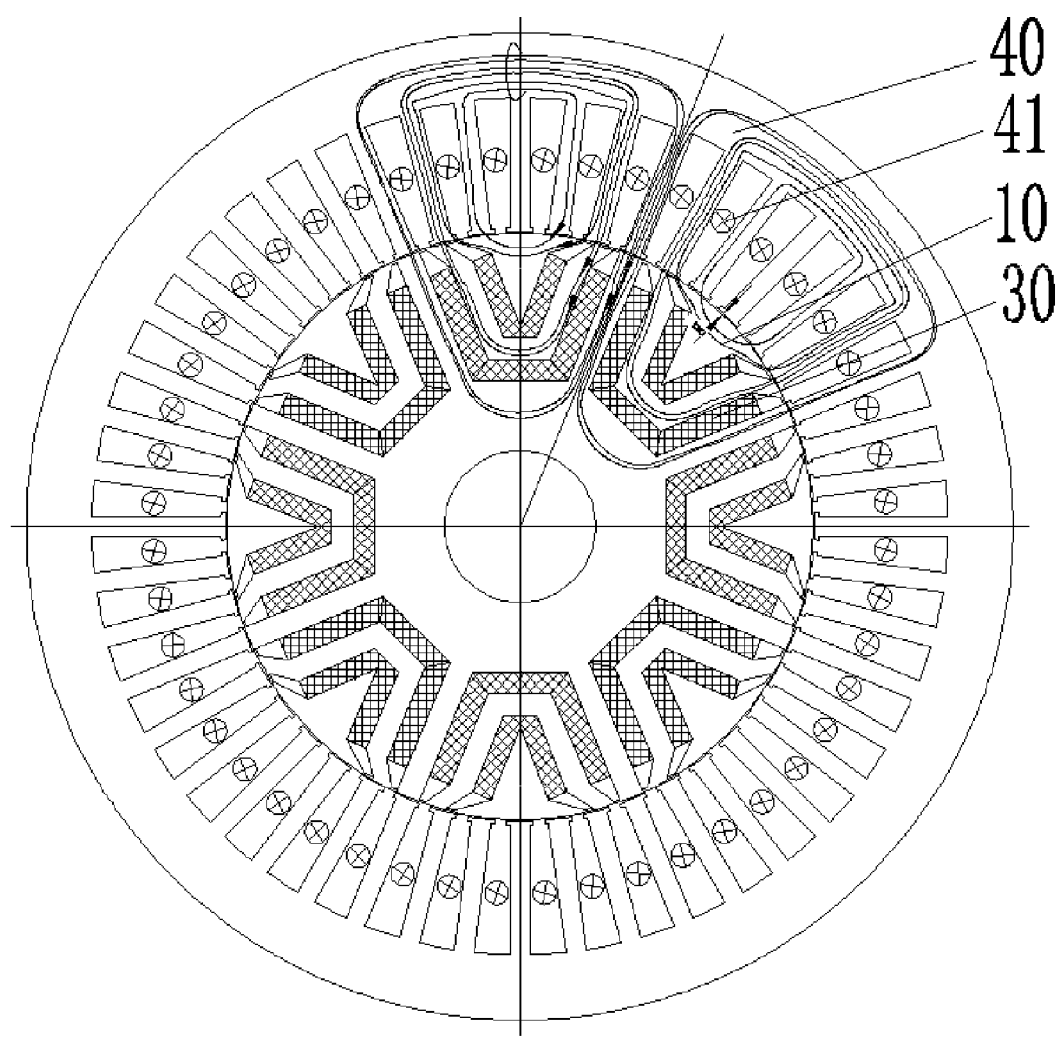
FIG. 7 is a schematic diagram illustrating a route of q-axis magnetic lines of a rotor structure according to a seventh embodiment of the present application.
Figure 8:
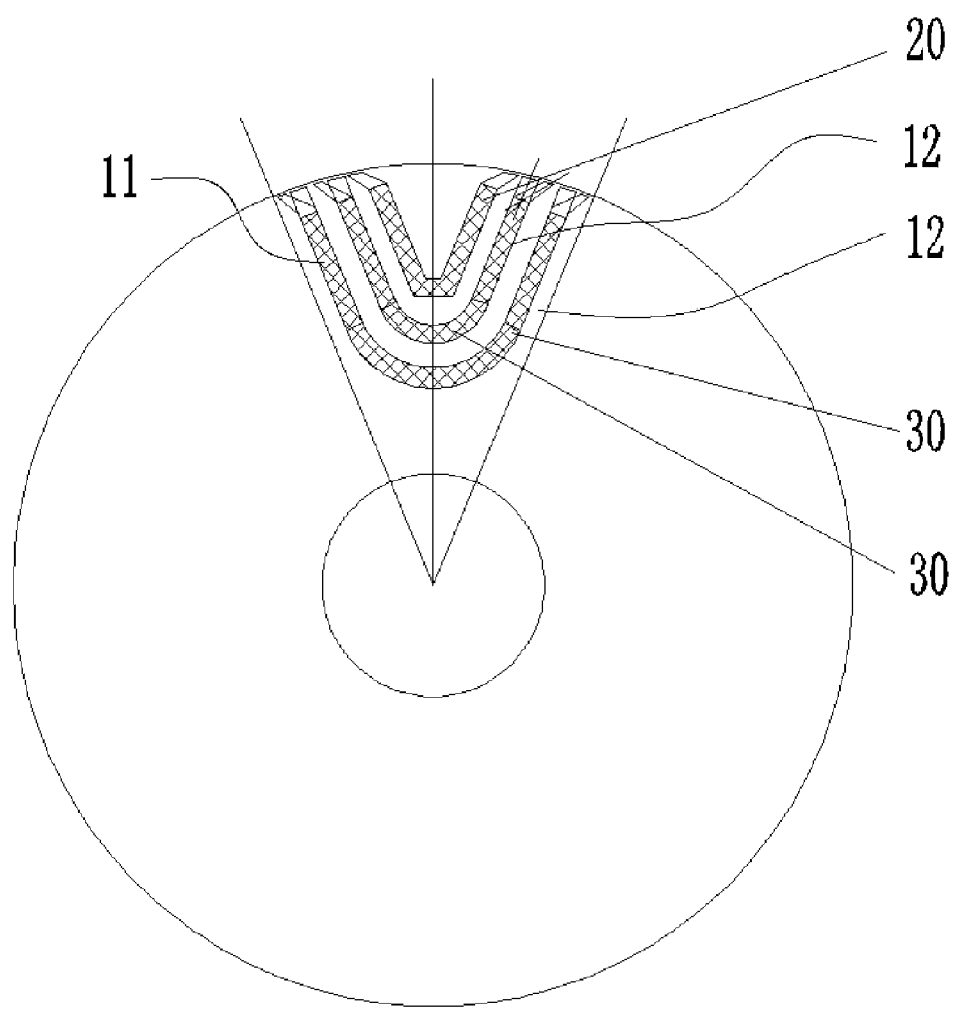
FIG. 8 is a schematic structural diagram illustrating a rotor structure according to an eighth embodiment of the present application.
Figure 9:
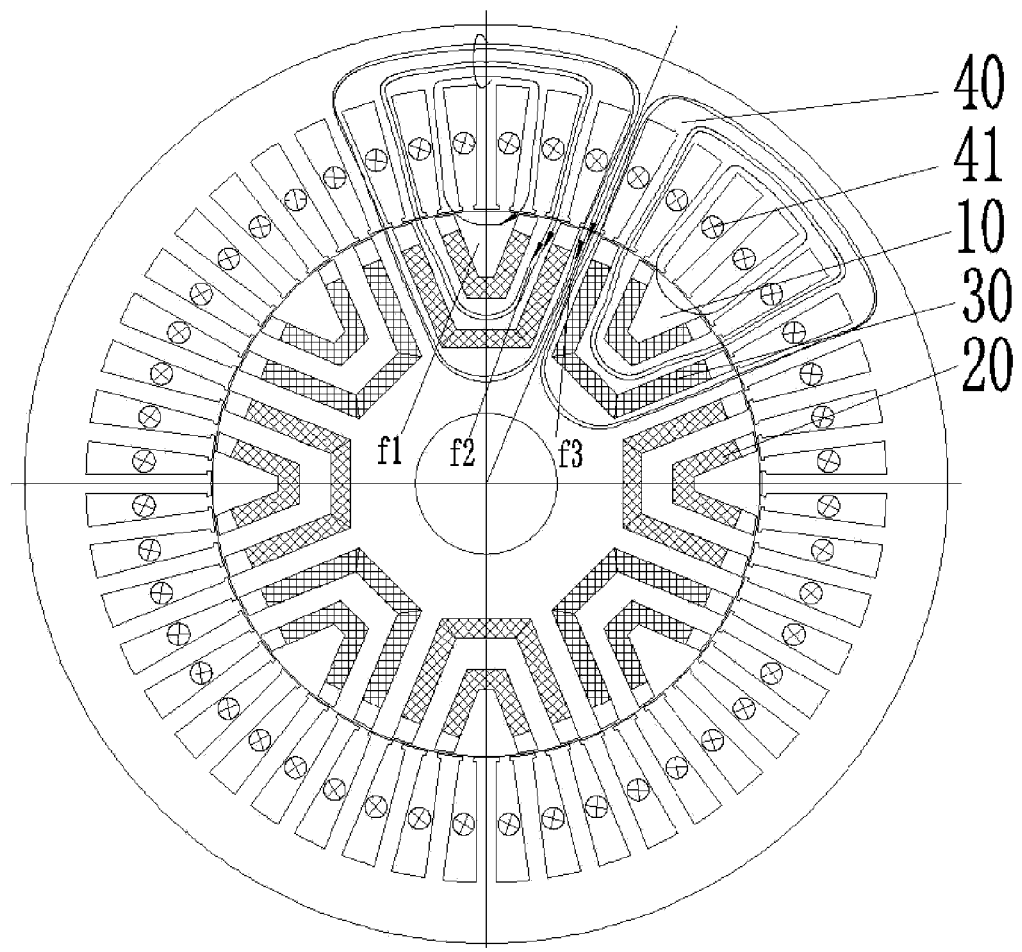
FIG. 9 is a schematic diagram illustrating a walking path of q-axis magnetic lines of an existing rotor structure.
Figure 10:
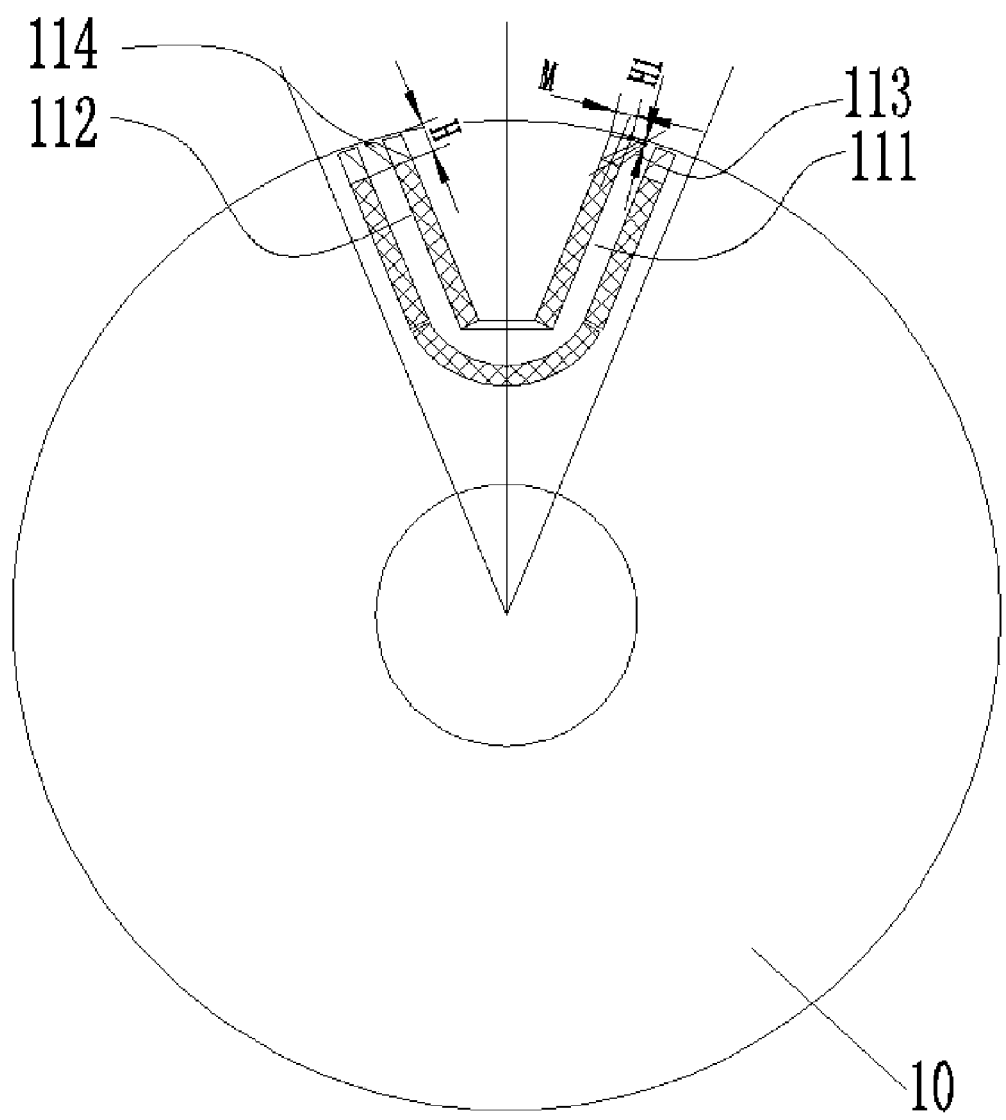
FIG. 10 is a schematic structural diagram illustrating a rotor structure according to a ninth embodiment of the present application.

As shown in FIG. 9, it is a schematic diagram illustrating a distribution of q-axis magnetic lines of an existing permanent magnet auxiliary synchronous reluctance motor including two layers of permanent magnets. There are three magnetic conduction channels from the stator teeth into the rotor respectively for the q-axis magnetic lines. The magnetic conduction channel f3 is formed between the innermost permanent magnet grooves of two adjacent magnetic poles. The magnetic conduction channel f2 is formed between the innermost permanent magnet groove and a second layer permanent magnet groove. The magnetic conduction channel f1 is formed from a magnetic conduction region between the second layer permanent magnet groove and a rotor outer circumference. Due to an uneven distribution of magnetic lines on the stator teeth, the magnetic lines entering the magnetic conduction channel f3 are the most, the magnetic lines entering the magnetic conduction channel f1 are the least, and magnetic circuits of the magnetic conduction channel f3 and the magnetic conduction channel f2 are relatively saturated. In a case where a load of the motor is heavy, the q-axis inductance of the motor will drop significantly, which affects the utilization of the reluctance torque of the motor. Especially for the permanent magnet auxiliary synchronous reluctance motor using ferrite, in a case that the permanent magnet is thickened to improve the efficiency and anti-demagnetization ability of the motor and thus the width of the magnetic conduction channel is difficult to increase, this phenomenon becomes more serious. Therefore, this solution proposes a deflected segment of an end of a magnetic conduction channel, which is deflected toward an inner layer permanent magnet, and a schematic diagram of the distribution of q-axis magnetic lines of the motor is shown in FIG. 7. By setting a deflected segment deflected toward an end of an inner layer permanent magnet groove at an end of a magnetic conduction channel, a direction of q-axis magnetic lines f of the stator can be effectively guided, and the magnetic lines originally entering a high magnetic saturation region, such as the magnetic lines entering the magnetic conduction channel f2 shown in the FIG. 7, is changed to enter a low magnetic saturation region, such as the magnetic conduction channel f1 shown in the figure, which generates more magnetic flux under the same exciting current, improves a q-axis inductance of a motor, increases a reluctance torque of the motor, and improves an efficiency and power density of the motor.

Figure 11:
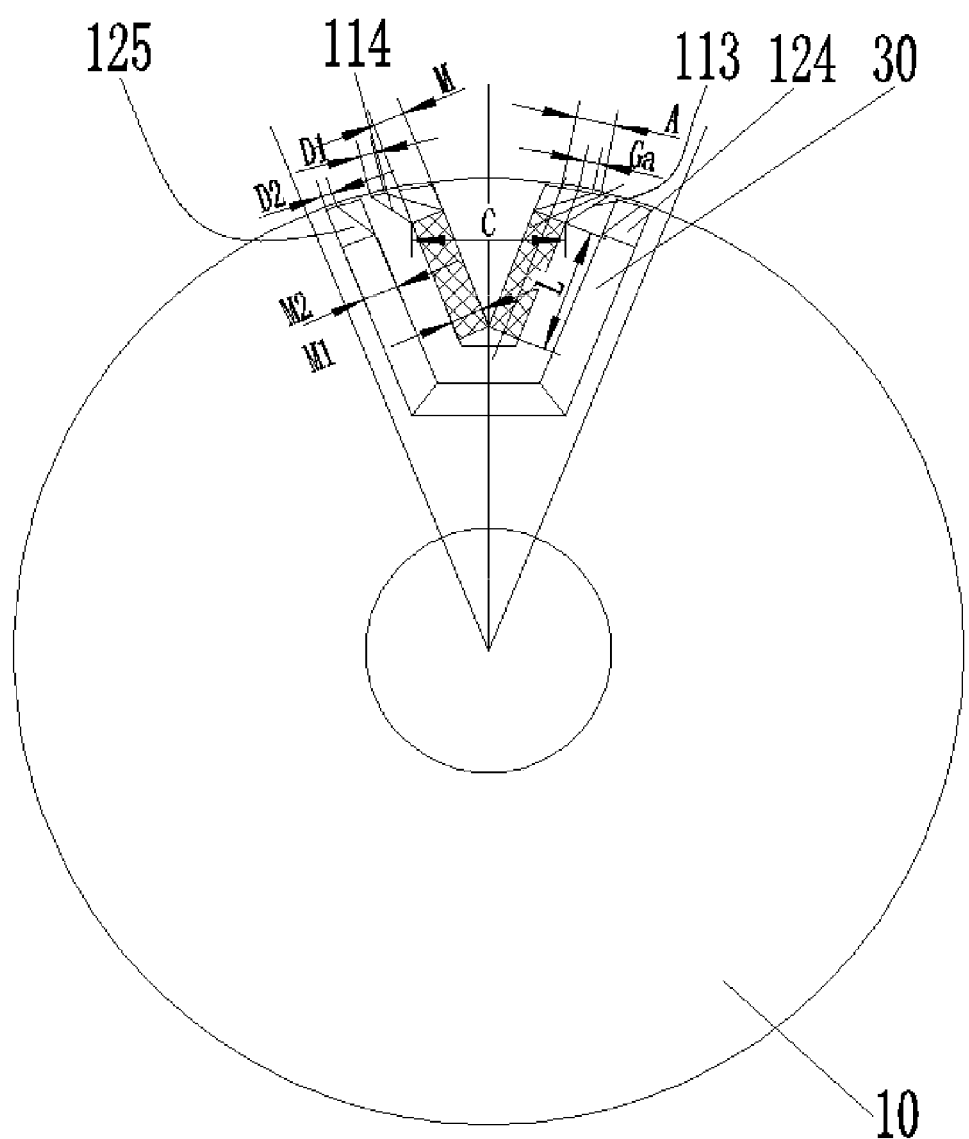
FIG. 11 is a schematic structural diagram illustrating a rotor structure according to a tenth embodiment of the present application.
Figure 12:
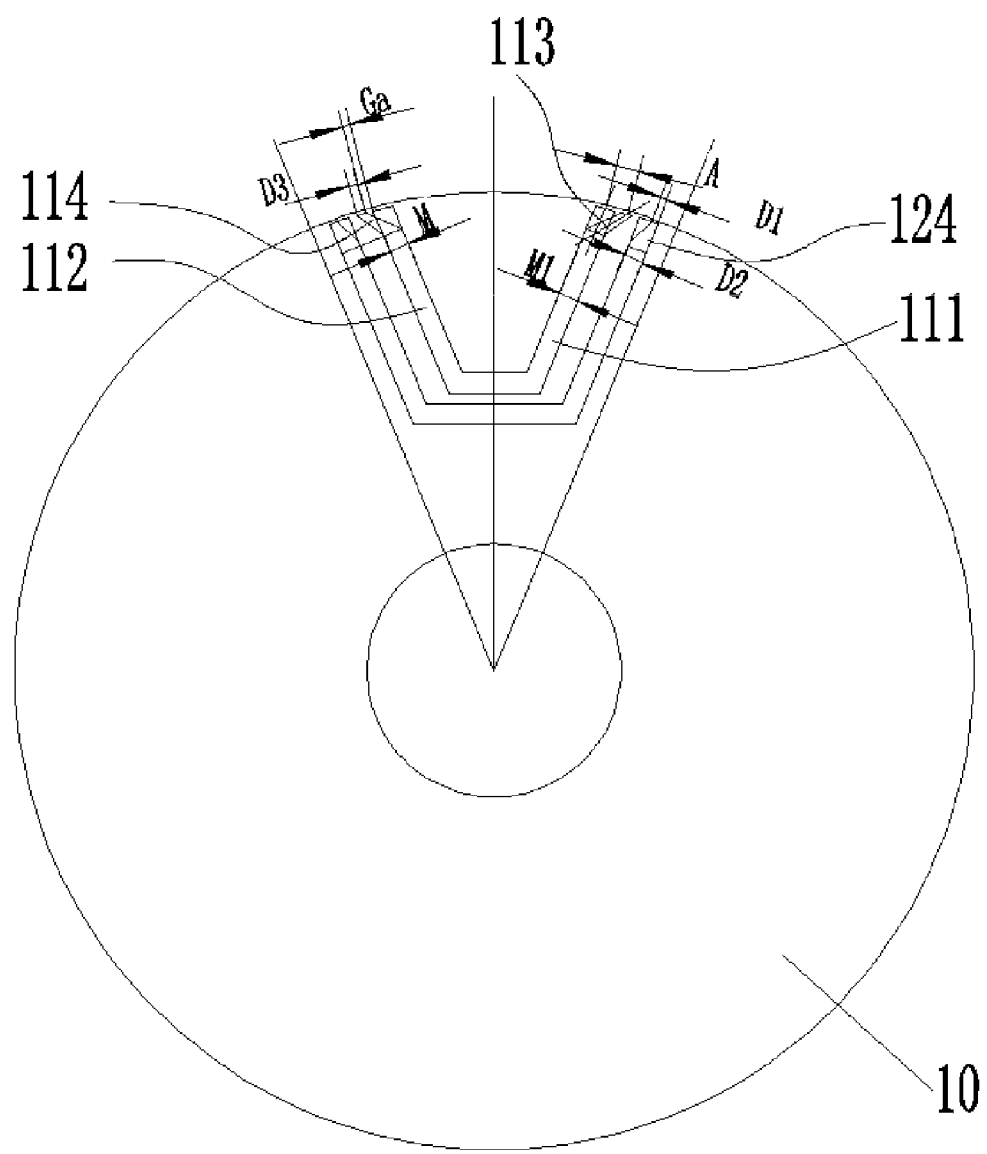
FIG. 12 is a schematic structural diagram illustrating a permanent magnet groove according to a rotor structure of the present application.
Figure 13:
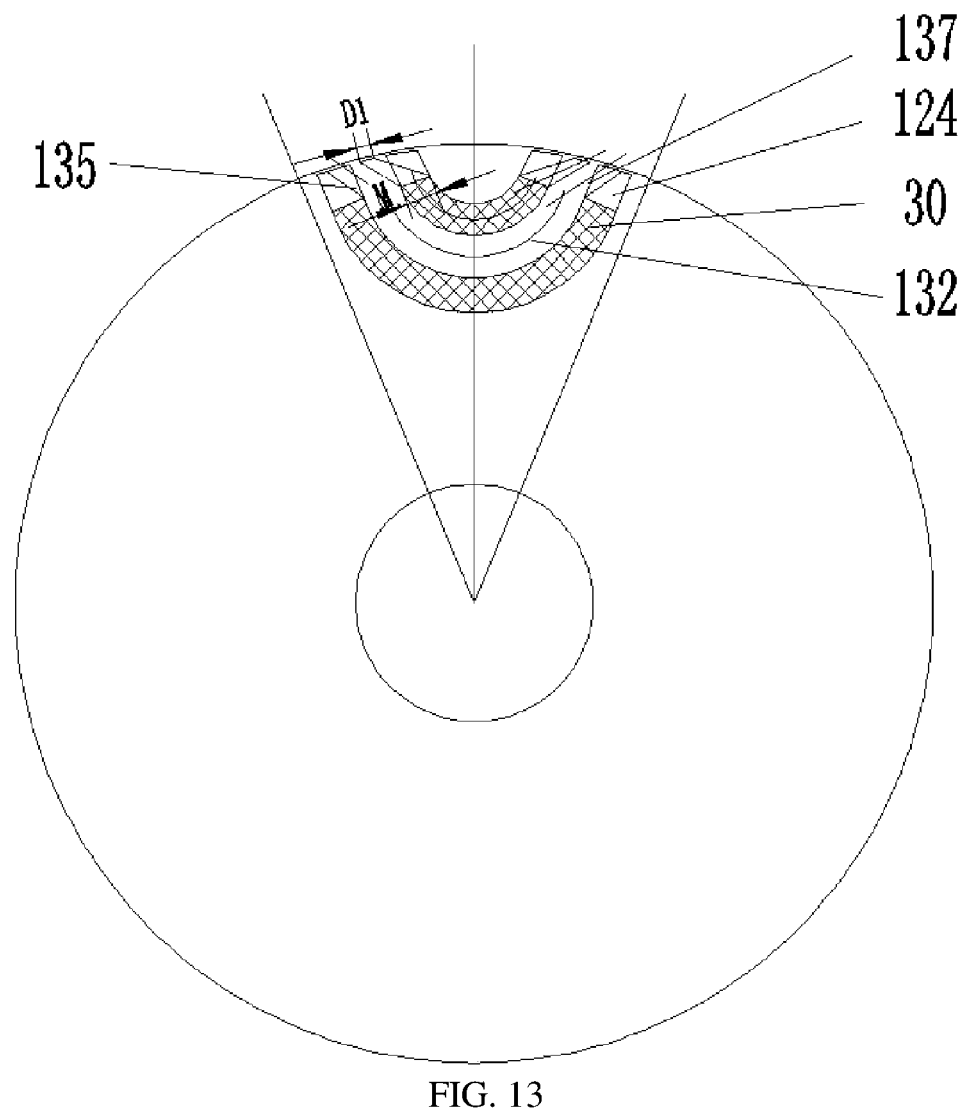
FIG. 13 is a schematic structural diagram illustrating a rotor structure according to an eleventh embodiment of the present application.
Figure 14:
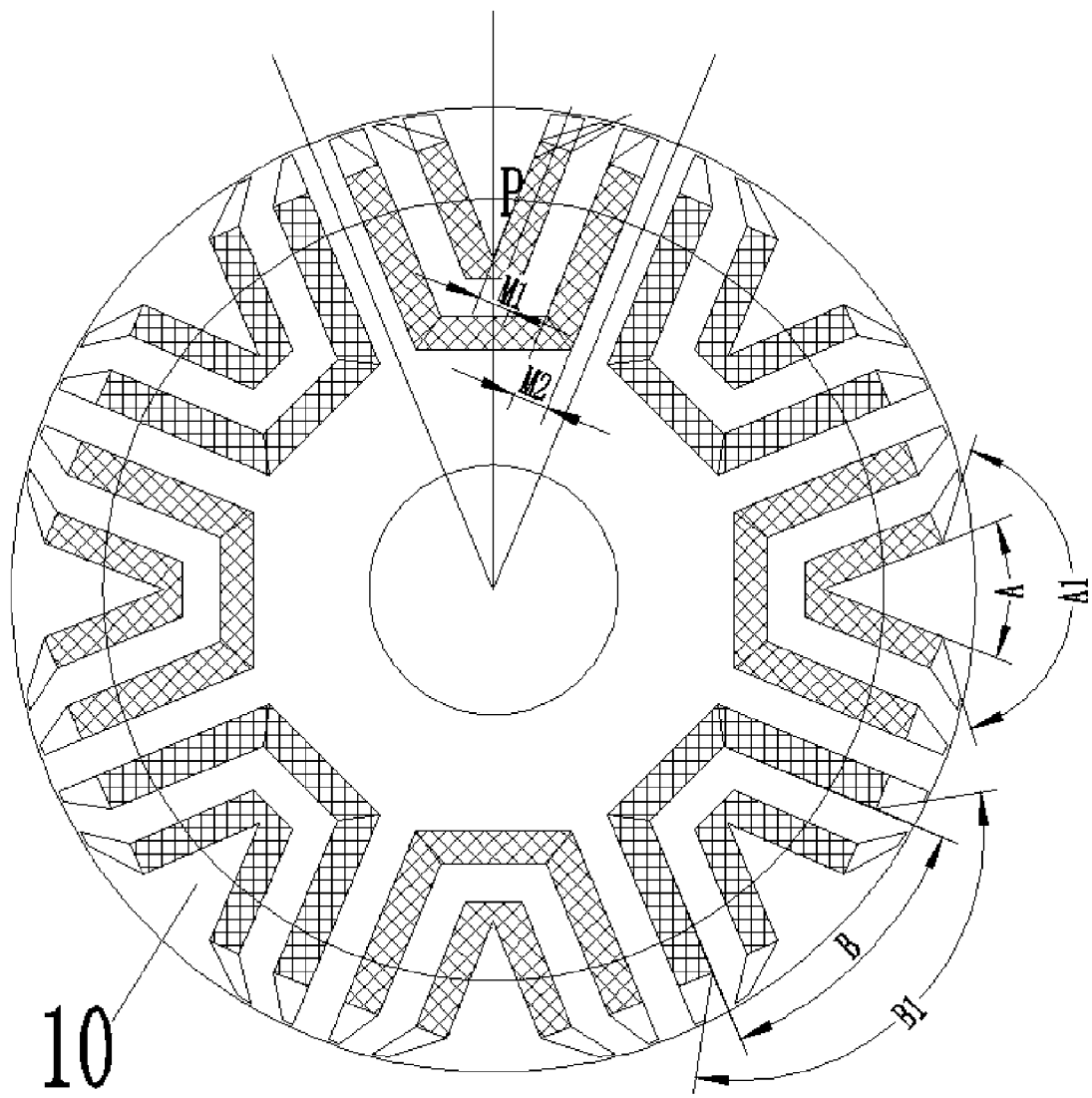
FIG. 14 is a schematic cross-sectional view illustrating a rotor structure according to a twelfth embodiment of the present application.

In addition, taking the innermost permanent magnet of the rotor as the first layer, the end of the second layer permanent magnet groove calculated from the inside to the outside has a deflected segment deflected toward the end of the inner layer permanent magnet groove, as shown in FIG. 11. The deflection of the end of the permanent magnet groove can better guide the magnetic lines of the stator into each of magnetic conduction channels more evenly.

Further, a width of a deflected part of the end of the permanent magnet groove is increased gradually toward the inside from approaching the outer surface of the rotor. The deflected part of the permanent magnet groove is disposed to be narrower on the outside and wider on the inside. On the one hand, it can reduce a decrease of q-axis magnetic flux resulted from a reduction of an inlet width of the magnetic conduction channel f2 after the permanent magnet groove is deflected. On the other hand, it can better guide the magnetic lines originally from passing through the magnetic conduction channel f2 into passing through the magnetic conduction channel f3 to the rotor.

As shown in FIGS. 10 to 14, in order to better guide the magnetic lines from passing through the magnetic conduction channel with high magnetic saturation to passing through the magnetic conduction channel with low magnetic saturation, a distance between a midpoint of an end edge of the deflected part of the second layer permanent magnet groove and a midpoint of an end edge of the undeflected part of the second layer permanent magnet groove is defined as A, a width of the undeflected part of the second layer permanent magnet groove near the end of the rotor is M, and $0.6M \leq A$. A shape of the undeflected end of the magnetic conduction channel is determined by the following method. In a case where a flat plate permanent magnet is installed in the permanent magnet groove, two edges of the permanent magnet groove are extended, and a distance between an outer edge of the permanent magnet groove close to the outer circumference of the rotor and the outer circumference of the rotor is the same as that after the permanent magnet groove is deflected. In a case where an permanent magnet in an arc shape is installed in the permanent magnet groove, a tangent line of an arc-shape is made at an end point of the permanent magnet groove and the tangent line is extended, and a distance between an outer edge of the permanent magnet groove close to the outer circumference of the rotor and the outer circumference of the rotor is the same as that after the permanent magnet groove is deflected. By controlling an amplitude of the deflection of the end of the permanent magnet groove and setting A to be equal to or greater than 0.6M, the guidance effect of the magnetic lines may be better, and a larger q-axis inductance may be obtained.

In this embodiment, an end point, near the outer side, of the end edge of the deflected part of the second layer permanent magnet groove is closer to the q axis of the rotor compared with a case that an end point, near the inner side, of the end edge of the undeflected part of the second layer permanent magnet groove. This setting is to achieve better guidance effect for the magnetic lines.

Further, a distance between the end point, near the outer side, of the end edge of the deflected part of the second layer permanent magnet groove and the end point, near the inner side, of the end edge of the undeflected part of the second layer permanent magnet groove is Ga, and Ga is approximately equal to an integer multiple of an air gap length g of the stator and rotor. By setting Ga to an integer multiple of the air gap length g of the stator and rotor, it is possible to effectively reduce a harmonic magnetic field content of the air gap and reduce a harmonic loss and torque ripple of the motor. The range here is 0.95 times to 1.05 times.

Further, a length of a deflected part of the end of the second layer permanent magnet groove is (H−H1), a width of the end of the undeflected part of the permanent magnet groove is M, and $0.4 \times M \leq (H-H1)$. H is a distance from an outer edge of the undeflected part of the permanent magnet groove to the outer circumference of the rotor, H1 is a thickness of a magnetic bridge formed by the deflected part of a permanent magnet rotor and the outer circumference of the rotor, and M is the width of the end of the undeflected part of the permanent magnet groove.

Figure 15:
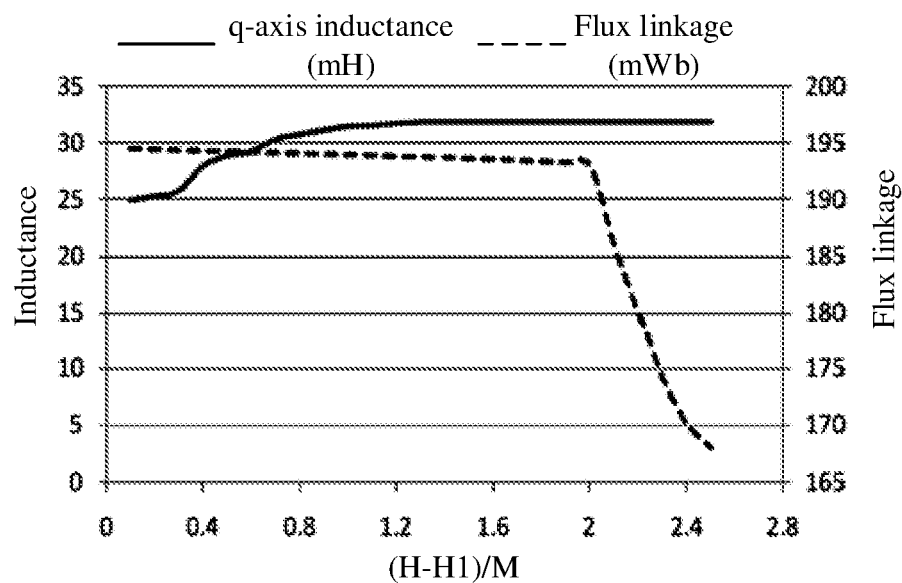
FIG. 15 is a schematic diagram illustrating effects of a length of a deflection groove located at an end of a permanent magnet groove of a rotor structure on performances of a motor.

As shown in FIG. 15, a study shows that the length of the deflected part of the permanent magnet groove has a greater influence on the q-axis inductance of the motor and the flux linkage of the motor. In a case where $0.4 \times M \leq (H-H1)$, the q-axis inductance can be significantly improved, but if it is greater than $2 \times M$, the magnetic flux area of the second layer permanent magnet is reduced, and the no-load flux linkage of the motor is decreased. Therefore, preferably, $0.4 \times M \leq (H-H1) \leq 2 \times M$.

Figure 5:
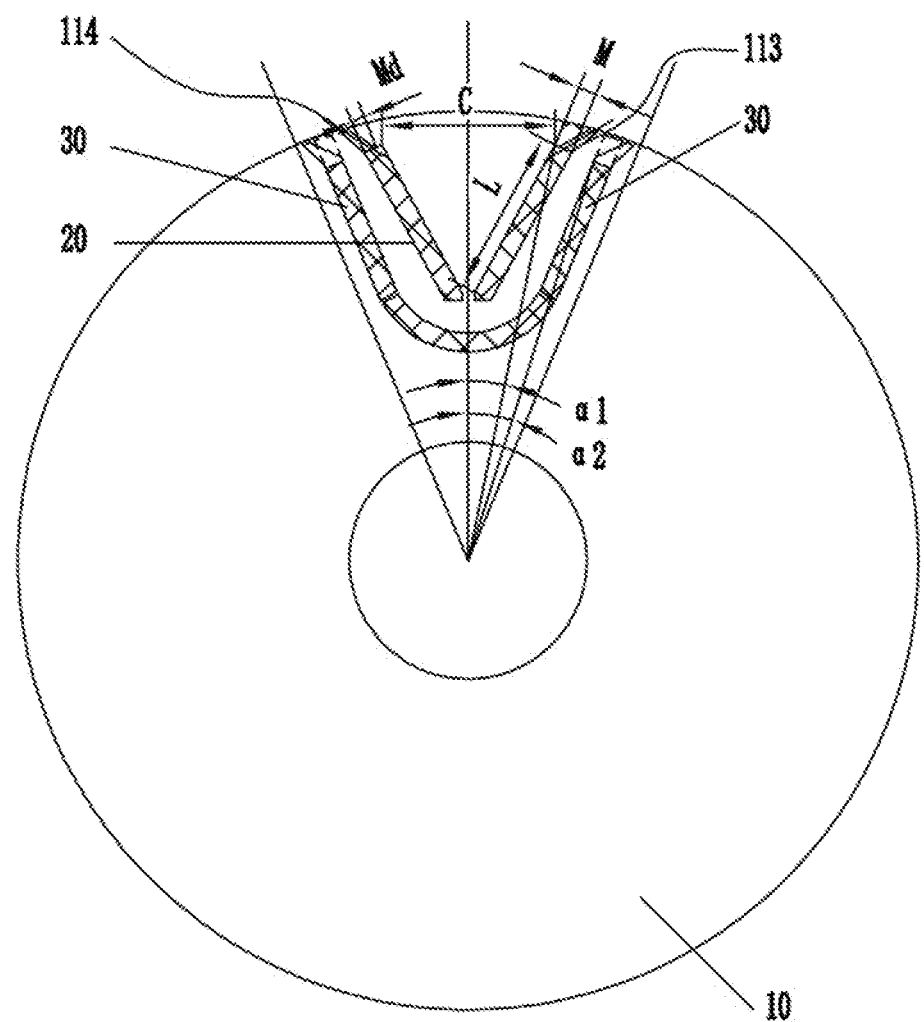
FIG. 5 is a schematic structural diagram illustrating a rotor structure according to a fifth embodiment of the present application.
Figure 6:
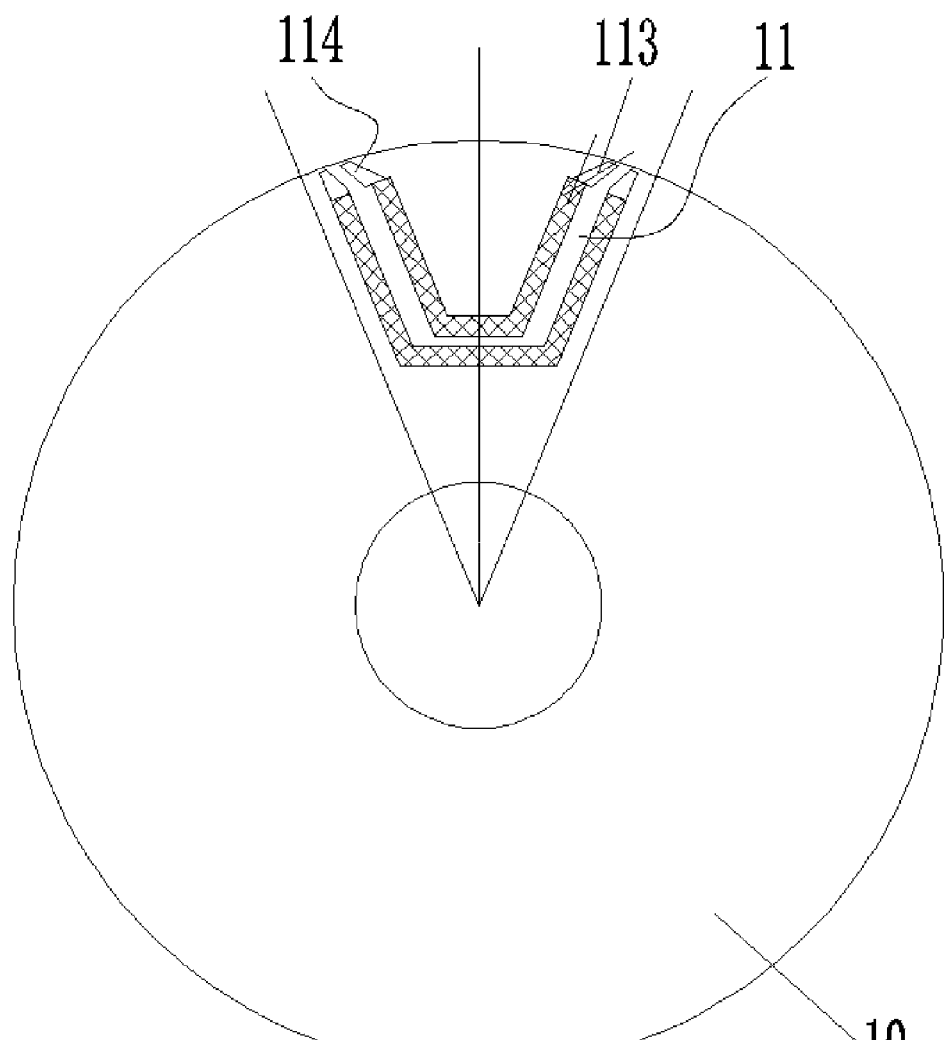
FIG. 6 is a schematic structural diagram illustrating a rotor structure according to a sixth embodiment of the present application.

As shown in FIG. 5, in order to better fix the permanent magnets, a width Md of the deflected part of the end of the second layer permanent magnet groove near the inner side of the rotor is less than the width M of the end of the undeflected part of the permanent magnet groove. A width D1 of the end of the deflected part of the second layer permanent magnet groove is less than the width M of the end of the undeflected part of the second layer permanent magnet groove, and $0.25 \times M \leq D1 \leq 0.8 \times M$, preferably $0.3 \times M \leq D1 \leq 0.45 \times M$.

Figure 16:
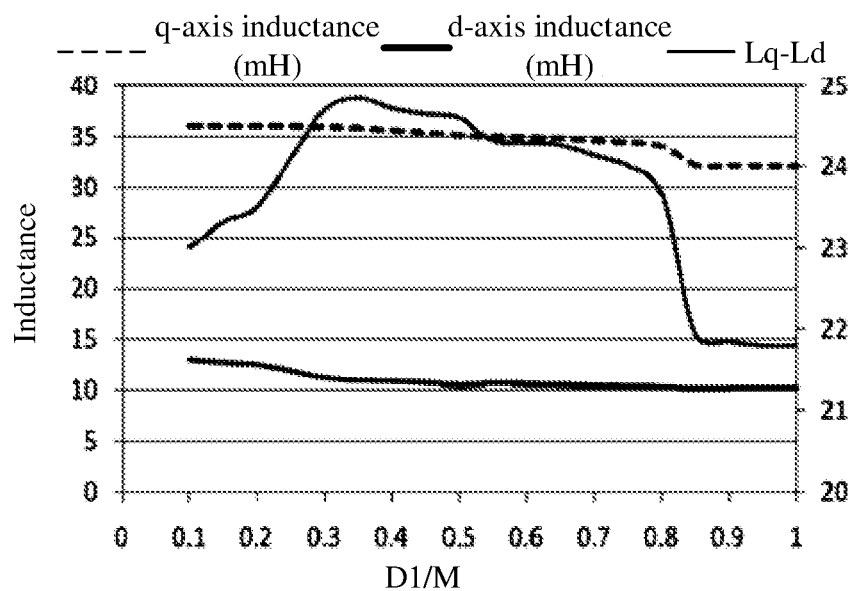
FIG. 16 is a schematic diagram illustrating effects of a width of an end of a deflection groove on motor parameters according to a rotor structure of the present application.
Figure 17:
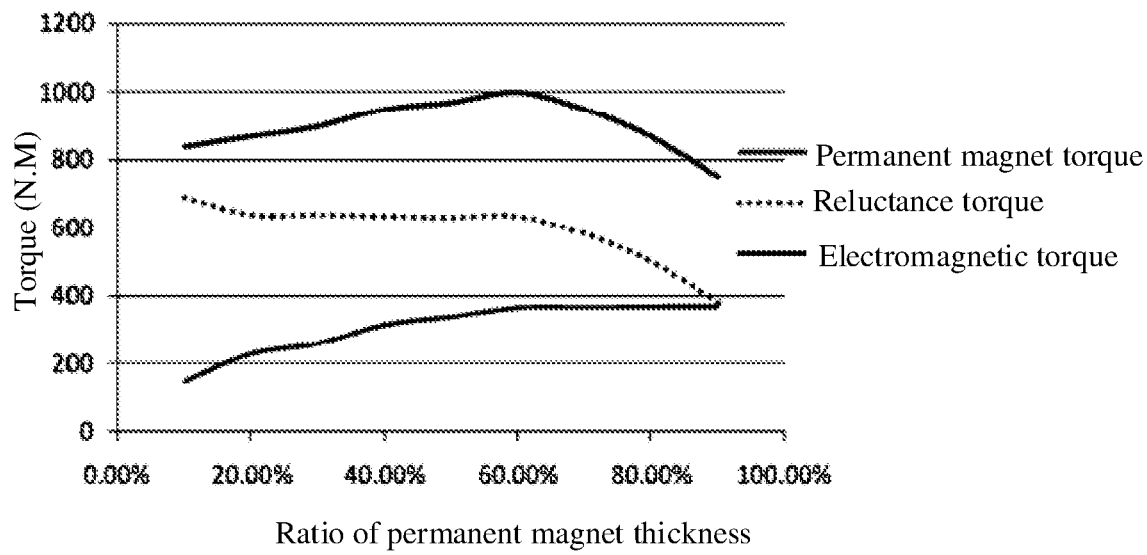
FIG. 17 is a schematic diagram illustrating a relationship between a ratio of permanent magnet thickness of a rotor structure and a torque.
Figure 18:
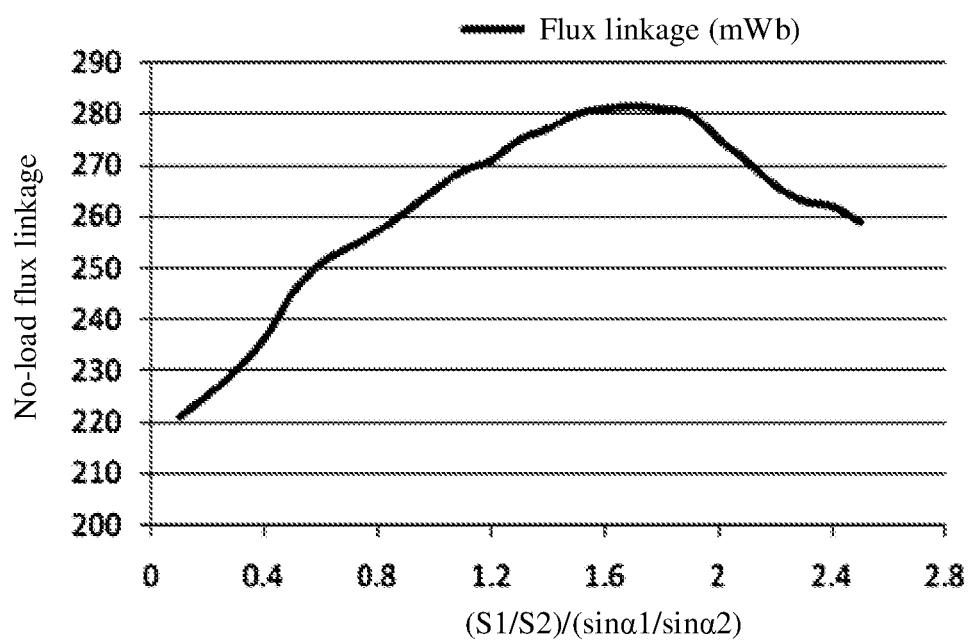
FIG. 18 is a schematic diagram illustrating effects of a ratio of areas of an inner layer and outer layer permanent magnet groove of a rotor structure on a flux linkage.

A study shows that the width D1 of the end of the deflected part of the permanent magnet groove has a certain influence on the quadrature and direct axis inductances of the motor. As shown in FIG. 16, in a case where the width D1 is greater than $0.8 \times M$, the end of the permanent magnet groove blocks the q-axis magnetic flux more, which causes the q-axis inductance to decrease. If the width D1 is less than $0.25 \times M$, the magnetic lines of d-axis inductance can easily pass through the magnetism isolation bridge between the rotor permanent magnet groove and the rotor outer circumference. In order to obtain a larger quadrature and direct axis inductance difference and improve the reluctance torque of the motor, $0.25 \times M \leq D1 \leq 0.8 \times M$, further preferably, $0.3 \times M \leq D1 \leq 0.45 \times M$. In addition, the deflected part of the end of the permanent magnet groove is not provided with a permanent magnet, which can effectively slow down a local demagnetization of an end permanent magnet, and improve the anti-demagnetization ability of the motor.

Further, the number of layers of rotor permanent magnets is 2 or 3. By setting the number of layers of rotor permanent magnets to 2 or 3, the reluctance torque of the motor can be improved, and a reduction of a working point of single layer permanent magnet resulted from an excessive number of layers of the permanent magnets can be avoided, which improves the efficiency and anti-demagnetization ability of the motor.

The rotor permanent magnets of the motor are ferrite permanent magnets. A center of the rotor is used as the rotating shaft hole 14 to make an arc, the arc passes through a center point P of an outer edge line of the outermost permanent magnet, and a ratio of a sum of thickness of the rotor permanent magnets at the arc to a circumference of the arc is 45%-70%. In a case where the permanent magnets of the motor rotor are ferrite, by setting the thickness of the permanent magnets in this range, a ratio of the thickness of the permanent magnets to a thickness of the magnetic conduction channel is in a better range, which can not only guarantee the high working points of the permanent magnets to obtain a large anti-demagnetization ability and a high no-load flux linkage of the motor, but also make the motor obtain a large quadrature and direct axis inductance difference to improve the reluctance torque of the motor. Preferably, the ratio of the sum of the thickness of the rotor permanent magnets at the arc to the circumference of the arc is 55%-65%.

In this embodiment, in order to enhance the mechanical strength of the rotor, one or more magnetism isolation bridges are disposed between layers of the permanent magnet grooves. Moreover, flat plate permanent magnets are placed at two ends of an inner layer permanent magnet groove of the rotor near the rotor outer circumference. The flat plate permanent magnets are located at the ends of the second layer permanent magnet groove near the outer circumference of the rotor. By locating the flat plate permanent magnets at ends of a permanent magnet groove, more permanent magnets can be located in the same rotor, such that the efficiency and anti-demagnetization ability of the motor are improved.

Further, the number of the layers of the rotor permanent magnets is two, the outer layer permanent magnet groove is substantively V-shaped, a length of one side permanent magnet in the V-shaped permanent magnet groove is L, and the maximum distance between the V-shaped permanent magnet is C, which satisfies $0.8 \times C \leq L$. The inner layer permanent magnet groove is substantively U-shaped and consists of at least three segments of permanent magnets. A ratio of a surface area of the outer layer permanent magnet near an outside of the rotor to a surface area of the inner layer permanent magnet near the outside of the rotor is S1/S2. An angle formed by two outer vertexes of ends of the outer layer permanent magnet near an outer surface of the rotor and a center of the rotor is $2 \times \alpha 1$, and an angle formed by two outer vertexes of ends of the inner layer permanent magnet near the outer surface of the rotor and the center of the rotor is $2 \times \alpha 2$, which satisfies the following relationship: $1.3 \times (\sin \alpha 1/\sin \alpha 2) \leq S1/S2 \leq 2 \times (\sin \alpha 1/\sin \alpha 2)$.

By setting an arrangement shape of the outer layer permanent magnet and an area ratio of the inner layer permanent magnet to the outer layer permanent magnet, the working points of the permanent magnets can be better adjusted, so that an average working point of the inner layer and outer layer permanent magnets is higher, and a ratio of the magnetic lines from the inner layer permanent magnet into the outer layer permanent magnet to the magnetic lines from the inner layer permanent magnet directly into the stator 40 is more reasonable, which increases a permanent magnet flux linkage of the motor and improves the efficiency and power factor of the motor. An influence of a surface ratio of the inner layer and outer layer permanent magnets on the flux linkage of the motor is shown in the FIG. 18. By setting the surface ratio of the inner layer to outer layer permanent magnets to $1.3 \times (\sin \alpha 1/\sin \alpha 2) \leq S1/S2 \leq 2 \times (\sin \alpha 1/\sin \alpha 2)$, a larger no-load flux linkage of the motor can be obtained. Preferably, $1.5 \times (\sin \alpha 1/\sin \alpha 2) \leq S1/S2 \leq 1.8 \times (\sin \alpha 1/\sin \alpha 2)$.

In this embodiment, a thickness M2 of flat plate permanent magnets, on two sides, of the innermost layer of the rotor is greater than a thickness M1 of flat plate permanent magnets at ends of a second layer, and $1.1 \times M1 \leq M2 \leq 1.8 \times M1$. A study shows that when a stator 40 applies a opposite directional magnetic field, a working point of the inner layer and a working point of the outer layer permanent magnets are different, and the working point of the inner layer permanent magnet is lower than the working point of the outer layer permanent magnet, which makes the inner layer permanent magnet more prone to local demagnetization and affects an overall anti-demagnetization ability of the motor. In order to alleviate this phenomenon, the thickness M2 of the inner layer permanent magnet is set to be larger than the thickness M1 of the outer layer permanent magnet. In order to make the inner layer and outer layer permanent magnets have the same anti-demagnetization ability, $1.1 \times M1 \leq M2 \leq 1.8 \times M1$. Preferably, $1.1 \times M1 \leq M2 \leq 1.3 \times M1$.

Widths of magnetic conduction channels formed by Inner layer and outer layer permanent magnets in rectangular shape are different, and the closer the magnetic conduction channel is to the outer surface of the rotor, the smaller the width of the magnetic conduction channel is. By gradually decreasing a width of the magnetic conduction channel, magnetic flux areas of the inner layer and outer layer permanent magnets can be adjusted better, and a consistency adjustment of working points of the inner layer and outer layer permanent magnets can be realized.

In this embodiment, an angle formed between outer edge lines of the deflected parts of the outer layer permanent magnet groove is A1, an angle formed between outer edge lines of the undeflected parts of the outer layer permanent magnet groove is A, and $2 \times A \leq A1$. Outer surfaces of ends of the inner layer permanent magnet groove have cut edges. An angle formed between outer edge lines of parts, located at the cut edge, of the inner layer permanent magnet groove is B1, an angle formed between outer edge lines of parts, not located at the cut edge, of the permanent magnet groove is B, $2 \times B \leq B1$, and $1.1 \times B1 \leq A1$. By setting the angle between the outer edge lines of the undeflected parts of the permanent magnet groove and the angle between the outer edge lines of the deflected parts, the q-axis magnetic lines of the stator can be guided more effectively into the magnetic conduction channels more evenly, increasing the q-axis inductance of the motor and improving the reluctance torque of the motor. An end of an outer surface the inner layer permanent magnet groove of the rotor has a cut edge, a width of a chamfered end of the permanent magnet groove is D1, a width of an unchamfered end of the permanent magnet groove is D2, and $D1 \leq 0.6 \times D2$. Since a width of an end of the inner layer permanent magnet groove is reduced due to the cut edge, the stator flux into the rotor can be increased effectively, enhancing the q-axis inductance of the motor. The end of the inner layer permanent magnet groove has a turning segment deflected toward a magnetic pole boundary line, which can better distribute the number of magnetic lines entering the magnetic conduction channel f2 and the magnetic conduction channel f3, reduce a local saturation of the magnetic conduction channels, and improve the reluctance torque of the motor. An End of each of the permanent magnet grooves has a turning segment towards a magnetic pole boundary line, which can further adjust a distribution of magnetic lines of each magnetic conduction channel and reduce a local saturation. All rotor magnetic poles are uniformly distributed on the circumference.

The above are only the preferred embodiments of the present application and are not intended to limit the present application. For those skilled in the art, the present application may have various changes and variations. Any modification, equivalent replacement, improvement, etc. made within the spirit and principles of the present application shall be included within the protection scope of the present application.

What is claimed is:

1. A rotor structure, comprising:
   a rotor body, wherein a permanent magnet groove group is disposed on the rotor body, the permanent magnet groove group comprises an outer layer permanent magnet groove and an inner layer permanent magnet groove, a magnetic conduction channel is formed between the outer layer permanent magnet groove and the inner layer permanent magnet groove which are adjacent, at least one end of the magnetic conduction channel is formed as a deflection segment, and a distance from the deflection segment to a quadrature-axis of the rotor body gradually decreases outward in a radial direction, so that the at least one end of the magnetic conduction channel tends to approach the quadrature-axis;

wherein the magnetic conduction channel comprises a first component segment, a second component segment and a third component segment connected in sequence, a first end of the first component segment is disposed toward a rotating shaft hole of the rotor body, a second end of the first component segment is disposed to extend toward an outer edge of the rotor body, a first end of the third component segment is disposed toward the rotating shaft hole, a second end of the third component segment is disposed to extend toward the outer edge of the rotor body, the first component segment and the third component segment are located on two sides of a direct axis, a distance from the first component segment to the direct axis gradually increases outward in a radial direction of the rotor body, and the deflection segment is formed at the second end of the first component segment and/or the second end of the third component segment;

the outer layer permanent magnet groove comprises: a first outer layer permanent magnet groove segment, a first end of the first outer layer permanent magnet groove segment being disposed to extend toward the rotating shaft hole, and a second end of the first outer layer permanent magnet groove segment being disposed toward the outer edge of the rotor body; and a second outer layer permanent magnet groove segment, a first end of the second outer layer permanent magnet groove segment being disposed to extend toward the rotating shaft hole and being disposed opposite to the first end of the first outer layer permanent magnet groove segment to form a V-shaped structure, a second end of the second outer layer permanent magnet groove segment being disposed toward the outer edge of the rotor body, and the first outer layer permanent magnet groove segment and the second outer layer permanent magnet groove segment being located on two sides of the direct axis; wherein the rotor structure further comprises an outer layer permanent magnet and an inner layer permanent magnet, the outer layer permanent magnet is disposed in the outer layer permanent magnet groove, and the inner layer permanent magnet is disposed in the inner layer permanent magnet groove; and the outer layer permanent magnet groove further comprises: a first deflection groove, a first end of the first deflection groove being connected to the second end of the first outer layer permanent magnet groove segment, a second end of the first deflection groove being disposed to extend toward the outer edge of the rotor body, a geometric center line in a length direction of the first deflection groove and a geometric center line in a length direction of the first outer layer permanent magnet groove segment forming a third angle, and a distance between the geometric center line in the length direction of the first deflection groove and the quadrature-axis gradually decreasing outward in the radial direction of the rotor body; wherein a distance between a midpoint of a side wall, near the outer edge of the rotor body, of the second end of the first deflection groove and an intersection point of a geometric center line of the first outer layer permanent magnet groove segment and the outer edge of the rotor body is A, a width of an end of the second end of the first outer layer permanent magnet groove segment is M, and 0.6M≤A.

2. The rotor structure according to claim 1, wherein a distance from the third component segment to the direct axis gradually increases outward in the radial direction of the rotor body.

3. The rotor structure according to claim 2, wherein the third component segment comprises:
   a first straight segment, a first end of the first straight segment being connected to the second component segment; and
   a second straight segment, a first end of the second straight segment being connected to a second end of the first straight segment, a second end of the second straight segment extending along the outer edge of the rotor body and gradually approaching the quadrature-axis, an extension line of a geometric center line of the first straight segment and an extension line of a geometric center line of the second straight segment forming a first angle, and the second straight segment forming the deflection segment.

4. The rotor structure according to claim 3, wherein a width of the first straight segment and a width of the second straight segment are equal.

5. The rotor structure according to claim 1, wherein the first component segment comprises:
   a third straight segment, a first end of the third straight segment being connected to the second component segment; and
   a fourth straight segment, a first end of the fourth straight segment being connected to a second end of the third straight segment, a second end of the fourth straight segment extending along the outer edge of the rotor body and gradually approaching the quadrature-axis, an extension line of a geometric center line of the third straight segment and an extension line of a geometric center line of the fourth straight segment forming a second angle, and the fourth straight segment forming the deflection segment.

6. The rotor structure according to claim 1, wherein a first magnetism isolation bridge is formed between the second end of the first deflection groove and the outer edge of the rotor body, 0.4×M≤(H−H1) or 0.4×M≤(H−H1)≤2×M, M is a width of an end of the second end of the first outer layer permanent magnet groove segment, H is a distance between the second end of the first outer layer permanent magnet groove segment and the outer edge of the rotor body, and H1 is a width of the first magnetism isolation bridge.

7. The rotor structure according to claim 1, wherein a width of the first end of the first deflection groove is less than a width of the second end of the first outer layer permanent magnet groove segment, and/or
   a width of the second end of the first deflection groove is less than the width of the second end of the first outer layer permanent magnet groove segment.

8. The rotor structure according to claim 1, wherein 0.25×M≤D1≤0.8×M, or 0.3×M≤D1≤0.45×M, M is a width of an end of the second end of the first outer layer permanent magnet groove segment, and D1 is a width of the second end of the first deflection groove.

9. The rotor structure according to claim 1, wherein the outer layer permanent magnet groove further comprises:
   a second deflection groove, a first end of the second deflection groove being connected to the second end of the second outer layer permanent magnet groove segment, a second end of the second deflection groove being disposed to extend toward the outer edge of the rotor body, a geometric center line in a length direction of the second deflection groove and a geometric center line in a length direction of the second outer layer permanent magnet groove segment forming a fourth angle, and a distance between the geometric center line in the length direction of the second deflection groove and the quadrature-axis being gradually decreasing outward in the radial direction of the rotor body.

10. The rotor structure according to claim 9, wherein the inner layer permanent magnet groove comprises a first inner layer permanent magnet groove segment, a second inner layer permanent magnet groove segment and a third inner layer permanent magnet groove segment disposed in sequence,
   the first inner layer permanent magnet groove segment, and the second inner layer permanent magnet groove segment and the third inner layer permanent magnet groove segment are connected in sequence to form a U-shaped structure with an opening toward the outer edge of the rotor body, or,
   the first inner layer permanent magnet groove segment, the second inner layer permanent magnet groove segment and the third inner layer permanent magnet groove segment are sequentially disposed at intervals, and a second magnetism isolation bridge is formed between adjacent two of the first inner layer permanent magnet groove segment, the second inner layer permanent magnet groove segment and the third inner layer permanent magnet groove segment.

11. The rotor structure according to claim 10, wherein the inner layer permanent magnet groove further comprises a third deflection groove and a fourth deflection groove, a first end of the third deflection groove is connected to an end of the first inner layer permanent magnet groove segment near the outer edge of the rotor body, and a second end of the third deflection groove extends along the outer edge of the rotor body and approaches the quadrature-axis gradually; and
   a first end of the fourth deflection groove is connected to an end of the third inner layer permanent magnet groove segment near the outer edge of the rotor body, and a second end of the fourth deflection groove extends along the outer edge of the rotor body and approaches the quadrature-axis gradually.

12. The rotor structure according to claim 11, wherein an angle A1 is formed between an extension line of a side wall, near the direct axis, of the first deflection groove and an extension line of a side wall, near the direct axis, of the second deflection groove, an angle A is formed by an extension line of a side wall, near the direct axis, of the first outer layer permanent magnet groove segment and an extension line of a side wall, near the direct axis, of the second outer layer permanent magnet groove segment, and $2 \times A \leq A1$;
   wherein an angle B1 is formed between an extension line of a side wall, near the direct axis, of the third deflection groove and an extension line of a side wall, near the direct axis, of the fourth deflection groove, an angle B is formed between an extension line of a side wall, near the direct axis, of the first inner layer permanent magnet groove segment and an extension line of a side wall, near the direct axis, of the third inner layer permanent magnet groove segment, and $2 \times B \leq B1$, $1.1 \times B1 \leq A1$.

13. The rotor structure according to claim 1, wherein the inner layer permanent magnet groove comprises a first inner layer permanent magnet groove segment, a third inner layer permanent magnet groove segment, a third deflection groove and a fourth deflection groove, a width of a second end of the third deflection groove and/or a width of a second end of the fourth deflection groove are D2, $D2 \leq 0.6 \times M2$, and M2 is a thickness of the inner layer permanent magnet.

14. The rotor structure according to claim 1, wherein a width of the magnetic conduction channel is increased gradually outward in a radial direction of the rotor body, or
   a width of the magnetic conduction channel is decreased gradually outward in a radial direction of the rotor body, or
   a width of the magnetic conduction channel is increased gradually within a preset distance and then decreased gradually outward in a radial direction of the rotor body, or
   a width of the magnetic conduction channel is decreased gradually within a preset distance and then increased gradually outward in a radial direction of the rotor body.

15. A permanent magnet auxiliary synchronous reluctance motor, comprising a rotor structure, the rotor structure comprising a rotor body, wherein a permanent magnet groove group is disposed on the rotor body, the permanent magnet groove group comprises an outer layer permanent magnet groove and an inner layer permanent magnet groove, a magnetic conduction channel is formed between the outer layer permanent magnet groove and the inner layer permanent magnet groove which are adjacent, at least one end of the magnetic conduction channel is formed as a deflection segment, and a distance from the deflection segment to a quadrature-axis of the rotor body gradually decreases outward in a radial direction, so that the at least one end of the magnetic conduction channel tends to approach the quadrature-axis;
   wherein the magnetic conduction channel comprises a first component segment, a second component segment and a third component segment connected in sequence, a first end of the first component segment is disposed toward a rotating shaft hole of the rotor body, a second end of the first component segment is disposed to extend toward an outer edge of the rotor body, a first end of the third component segment is disposed toward the rotating shaft hole, a second end of the third component segment is disposed to extend toward the outer edge of the rotor body, the first component segment and the third component segment are located on two sides of a direct axis, a distance from the first component segment to the direct axis gradually increases outward in a radial direction of the rotor body, and the deflection segment is formed at the second end of the first component segment and/or the second end of the third component segment;
   the outer layer permanent magnet groove comprises: a first outer layer permanent magnet groove segment, a first end of the first outer layer permanent magnet groove segment being disposed to extend toward the rotating shaft hole, and a second end of the first outer layer permanent magnet groove segment being disposed toward the outer edge of the rotor body; and a second outer layer permanent magnet groove segment, a first end of the second outer layer permanent magnet groove segment being disposed to extend toward the rotating shaft hole and being disposed opposite to the first end of the first outer layer permanent magnet groove segment to form a V-shaped structure, a second end of the second outer layer permanent magnet groove segment being disposed toward the outer edge of the rotor body, and the first outer layer permanent magnet groove segment and the second outer layer permanent magnet groove segment being located on two sides of the direct axis; wherein the rotor structure further comprises an outer layer permanent magnet and an inner layer permanent magnet, the outer layer permanent magnet is disposed in the outer layer permanent magnet groove, and the inner layer permanent magnet is disposed in the inner layer permanent magnet groove; and the outer layer permanent magnet groove further comprises: a first deflection groove, a first end of the first deflection groove being connected to the second end of the first outer layer permanent magnet groove segment, a second end of the first deflection groove being disposed to extend toward the outer edge of the rotor body, a geometric center line in a length direction of the first deflection groove and a geometric center line in a length direction of the first outer layer permanent magnet groove segment forming a third angle, and a distance between the geometric center line in the length direction of the first deflection groove and the quadrature-axis gradually decreasing outward in the radial direction of the rotor body; wherein a distance between a midpoint of a side wall, near the outer edge of the rotor body, of the second end of the first deflection groove and an intersection point of a geometric center line of the first outer layer permanent magnet groove segment and the outer edge of the rotor body is A, a width of an end of the second end of the first outer layer permanent magnet groove segment is M, and $0.6M \leq A$.

16. An electric vehicle, comprising a rotor structure, the rotor structure comprising a rotor body, wherein a permanent magnet groove group is disposed on the rotor body, the permanent magnet groove group comprises an outer layer permanent magnet groove and an inner layer permanent magnet groove, a magnetic conduction channel is formed between the outer layer permanent magnet groove and the inner layer permanent magnet groove which are adjacent, at least one end of the magnetic conduction channel is formed as a deflection segment, and a distance from the deflection segment to a quadrature-axis of the rotor body gradually decreases outward in a radial direction, so that the at least one end of the magnetic conduction channel tends to approach the quadrature-axis;

wherein the magnetic conduction channel comprises a first component segment, a second component segment and a third component segment connected in sequence, a first end of the first component segment is disposed toward a rotating shaft hole of the rotor body, a second end of the first component segment is disposed to extend toward an outer edge of the rotor body, a first end of the third component segment is disposed toward the rotating shaft hole, a second end of the third component segment is disposed to extend toward the outer edge of the rotor body, the first component segment and the third component segment are located on two sides of a direct axis, a distance from the first component segment to the direct axis gradually increases outward in a radial direction of the rotor body, and the deflection segment is formed at the second end of the first component segment and/or the second end of the third component segment;

the outer layer permanent magnet groove comprises: a first outer layer permanent magnet groove segment, a first end of the first outer layer permanent magnet groove segment being disposed to extend toward the rotating shaft hole, and a second end of the first outer layer permanent magnet groove segment being disposed toward the outer edge of the rotor body; and a second outer layer permanent magnet groove segment, a first end of the second outer layer permanent magnet groove segment being disposed to extend toward the rotating shaft hole and being disposed opposite to the first end of the first outer layer permanent magnet groove segment to form a V-shaped structure, a second end of the second outer layer permanent magnet groove segment being disposed toward the outer edge of the rotor body, and the first outer layer permanent magnet groove segment and the second outer layer permanent magnet groove segment being located on two sides of the direct axis; wherein the rotor structure further comprises an outer layer permanent magnet and an inner layer permanent magnet, the outer layer permanent magnet is disposed in the outer layer permanent magnet groove, and the inner layer permanent magnet is disposed in the inner layer permanent magnet groove; and the outer layer permanent magnet groove further comprises: a first deflection groove, a first end of the first deflection groove being connected to the second end of the first outer layer permanent magnet groove segment, a second end of the first deflection groove being disposed to extend toward the outer edge of the rotor body, a geometric center line in a length direction of the first deflection groove and a geometric center line in a length direction of the first outer layer permanent magnet groove segment forming a third angle, and a distance between the geometric center line in the length direction of the first deflection groove and the quadrature-axis gradually decreasing outward in the radial direction of the rotor body; wherein a distance between a midpoint of a side wall, near the outer edge of the rotor body, of the second end of the first deflection groove and an intersection point of a geometric center line of the first outer layer permanent magnet groove segment and the outer edge of the rotor body is A, a width of an end of the second end of the first outer layer permanent magnet groove segment is M, and $0.6M \leq A$.

* * * * *